US 6,609,768 B1

(12) United States Patent
Frank

(10) Patent No.: US 6,609,768 B1
(45) Date of Patent: *Aug. 26, 2003

(54) EMERGENCY STEERING WHEEL BRAKING SYSTEM

(76) Inventor: Donald E. Frank, 2934 60th Ave. S., St. Petersburg, FL (US) 33712

( * ) Notice: Subject to any disclaimer, the term of this patent is extended or adjusted under 35 U.S.C. 154(b) by 0 days.

This patent is subject to a terminal disclaimer.

(21) Appl. No.: 10/123,552

(22) Filed: Apr. 16, 2002

Related U.S. Application Data

(63) Continuation-in-part of application No. 09/837,135, filed on Apr. 18, 2001, now Pat. No. 6,371,572.
(60) Provisional application No. 60/202,960, filed on May 9, 2000, and provisional application No. 60/234,582, filed on Sep. 22, 2000.

(51) Int. Cl.[7] .................................................. H01H 9/00
(52) U.S. Cl. ........................... 303/20; 303/124; 74/489; 74/484 R; 200/61.57
(58) Field of Search .......................... 200/61.54, 61.55, 200/61.56, 61.57, 61.38; 74/558, 489, 484 R; 280/264, 750; 303/124, 20

(56) References Cited

U.S. PATENT DOCUMENTS

| | | | | |
|---|---|---|---|---|
| 1,389,366 A | * | 8/1921 | Loder | 200/61.27 |
| 1,500,191 A | * | 7/1924 | Herbert | 200/61.57 |
| 1,574,475 A | * | 2/1926 | Fox | 200/61.57 |
| 2,025,979 A | * | 12/1935 | Getty | 200/16 D |
| 2,025,980 A | * | 12/1935 | Getty | 200/61.57 |
| 2,173,265 A | * | 9/1939 | Richards | 200/61.32 |
| 2,211,131 A | * | 8/1940 | Knauber | 200/61.57 |
| 2,296,003 A | * | 9/1942 | Van Loo | 180/272 |
| 2,796,484 A | * | 6/1957 | Wolf | 200/61.43 |
| 2,943,164 A | * | 6/1960 | Kniffin, Jr. | 200/61.57 |
| 2,946,869 A | * | 7/1960 | Parks | 200/61.57 |
| 3,304,801 A | * | 2/1967 | Sakita et al. | 74/552 |
| 3,485,974 A | * | 12/1969 | Wolf et al. | 200/275 |
| 3,515,825 A | * | 6/1970 | Burton et al. | 200/61.57 |
| 3,876,844 A | * | 4/1975 | Scherenberg | 200/61.57 |
| 3,886,339 A | * | 5/1975 | Jubenville et al. | 200/61.45 M |
| 4,077,487 A | * | 3/1978 | Misinchuk | 180/78 |
| 4,219,800 A | * | 8/1980 | LeViness | 200/61.57 |
| 4,222,614 A | * | 9/1980 | Spechko | 280/446.1 |
| 4,295,687 A | * | 10/1981 | Becker et al. | 303/20 |
| 4,792,783 A | * | 12/1988 | Burgess et al. | 307/10.1 |
| 5,085,098 A | * | 2/1992 | Buckley | 74/558 |
| 5,626,402 A | * | 5/1997 | Saffran | 188/3 H |
| 5,707,262 A | * | 1/1998 | Huntley et al. | 440/61 |
| 5,855,144 A | * | 1/1999 | Parada | 200/61.54 |
| 5,969,616 A | * | 10/1999 | Tschoi | 340/576 |
| 6,068,352 A | * | 5/2000 | Kulkarni et al. | 303/20 |
| 6,161,449 A | * | 12/2000 | Fujimori | 74/557 |
| 6,218,947 B1 | * | 4/2001 | Sutherland | 340/576 |
| 6,246,808 B1 | * | 6/2001 | Mallon | 385/16 |

* cited by examiner

Primary Examiner—Douglas C. Butler
Assistant Examiner—Benjamin A Pezzlo

(57) ABSTRACT

A trailer brake control system comprises a trailer. The trailer has brakes. The trailer also has a secondary electrical receiver. A towing vehicle is also provided. The vehicle has a steering wheel. The vehicle also has a secondary electrical transmitter. A steering wheel cover having a primary wireless signal transmitter is provided. The signal transmitter has a power source and a flexible torus-shaped tube. The tube has a hollow bore. Secured within the bore are a pair of wires, one flat and one toothed, offset from each other. Both wires are electronically coupled to the primary signal transmitter. A trailer brake processor is provided next. The brake processor has a trailer brake actuating switch. The actuating switch is electrically coupled with the brakes of the trailer. A primary signal receiver is coupled to the actuating switch and adapted to receive signals from the primary signal transmitter. A manual switch is also coupled to the actuating switch.

10 Claims, 25 Drawing Sheets

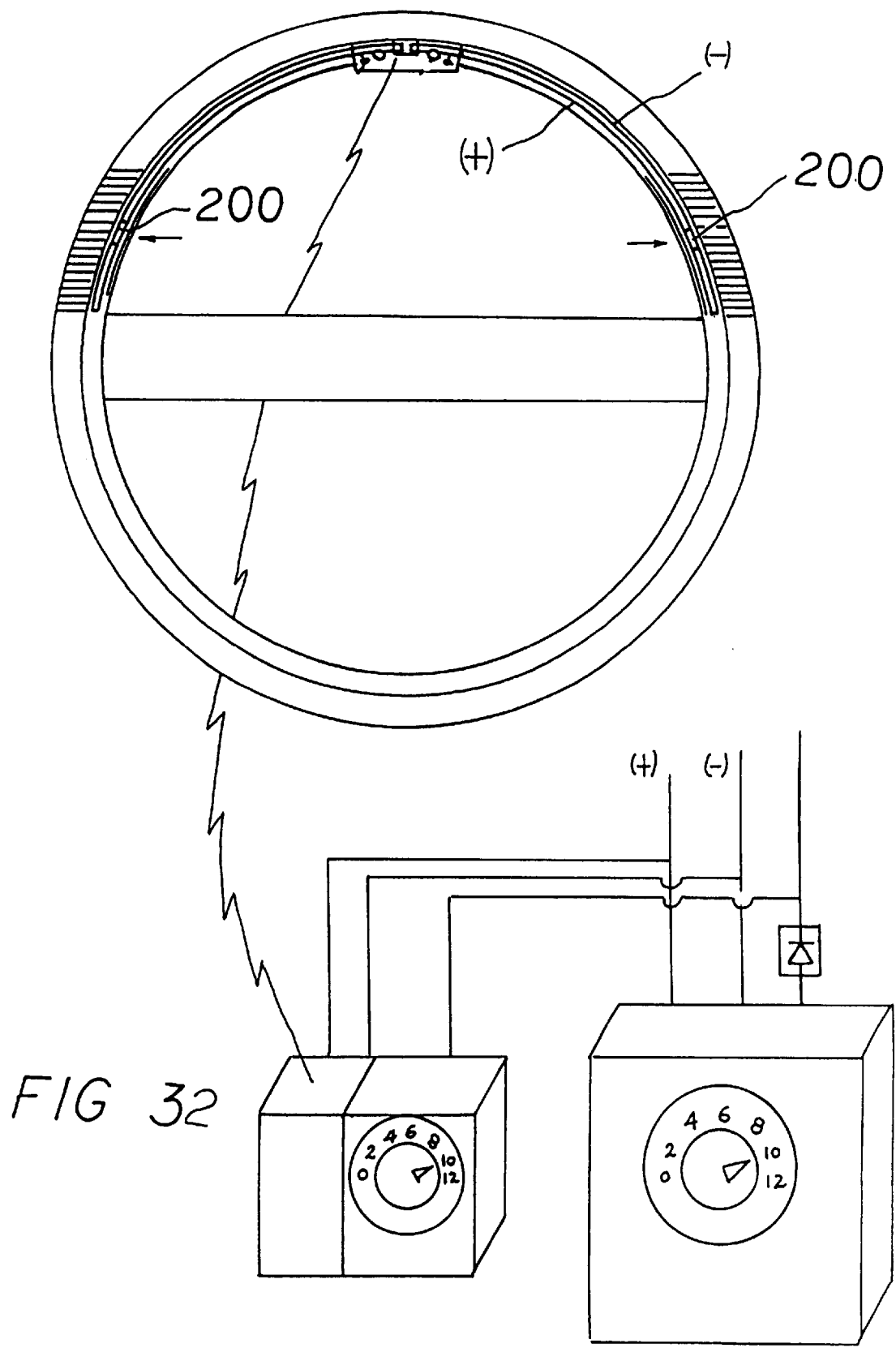

EMERGENCY STEERING WHEEL BRAKING SYSTEM

RELATED APPLICATIONS

The present invention is a continuation-in-part of patent application Ser. No. 09/837,135 filed Apr. 18, 2001, now U.S. Pat. No. 6,371,572 entitled Emergency Steering Wheel Braking System; provisional patent application Ser. No. 60/202,960 filed May 9, 2000; and provisional patent application Ser. No. 60/234,582 filed Sep. 22, 2000. The subject matter of such prior patent applications is incorporated herein by reference.

BACKGROUND OF THE INVENTION

1. Field of the Invention

The present invention relates to an emergency steering wheel braking system and more particularly pertains to rapidly and instinctively applying a braking force to trailer brakes only in an emergency situation such as fish-tailing. More specifically, the present invention relates to a trailer brake control system and more particularly pertains to rapidly and instinctively applying a braking force to just the trailer brakes in an emergency situation such as fish-tailing. The primary cause of trailer rollovers is the driver's inability to rapidly abort fish-tailing. The present invention eliminates driver inefficiency in the aforementioned regard. The present invention eliminates fish-tailing more rapidly and instinctively than any known prior art. Fish-tailing refers to having the rear end slide from side to side out of control while moving forward. Instinctively refers to the tendency to make a complex and specific response to environmental stimuli without involving reason.

2. Description of the Prior Art

The use of trailer and brake combinations of known designs and configurations is known in the prior art. More specifically, trailer and brake combinations of known designs and configurations previously devised and utilized for the purpose of safely braking a trailer though conventional methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,747,683 to Gerum et al discloses a method of drive stability enhancement of multiunit vehicles. U.S. Pat. No. 6,068,352 to Kulkarni discloses a microprocessor-based control for trailer brakes. Lastly, U.S. Pat. No. D436,932 to Roth discloses a design for an electronic controller for towed vehicle brakes.

A controller for the application of braking forces only to a trailer, as during an emergency situation, such as gusts and crosswinds, requires a driver to keep one hand on the steering wheel while moving the other hand to a trigger-like mechanism on the controller. Such action by a driver is not a normal, or instinctive, reaction to an emergency situations since a normal or instinctive reaction would be to keep both hands on the steering wheel in an effort to overcome fish-tailing which often results in an accident with damage or total loss to the vehicles and injury or death to the driver and passengers.

While these devices fulfill their respective, particular objectives and requirements, the aforementioned patents do not describe a trailer brake control system that allows rapid and instinctive application of a braking force to a trailer in an emergency situation.

In this respect, the trailer brake control system according to the present invention substantially departs from the conventional concepts and designs of the prior art, and in doing so provides an apparatus primarily developed for the purpose of rapidly and instinctively applying a braking force to a trailer in an emergency situation or to prevent an emergency situation by pre-applying the trailer brakes.

Therefore, it can be appreciated that there exists a continuing need for a new and improved trailer brake control system which can be used for rapidly and instinctively applying a braking force to a trailer in an emergency situation. In this regard, the present invention substantially fulfills this need.

SUMMARY OF THE INVENTION

In view of inherent disadvantages in known types of trailer and brake combinations of conventional designs and configurations now present in the prior art, the present invention provides an improved trailer brake control system. As such, the general purpose of the present invention, which will be described subsequently in greater detail, is to provide a new and improved trailer brake control system and method which has all the advantages of the prior art and none of the disadvantages.

To attain this, the present invention essentially comprises a trailer. The trailer has electrically operated brakes. The trailer also has a secondary electrical receiver. Provided next is a towing vehicle. The vehicle has a steering wheel and a dashboard. The vehicle also has a secondary electrical transmitter. The steering wheel is in a torus-shaped configuration with an outer periphery. The secondary transmitter of the vehicle is electrically coupled to the secondary receiver of the trailer. The vehicle is adapted to pull the trailer. Next provided is a steering wheel cover. The steering wheel cover is coupled around the outer periphery of the steering wheel of the vehicle. The steering wheel cover has an elastomeric, flexible, resilient, hollow sheath. The sheath is in a circular configuration. The sheath has a first edge, second edge, interior face, exterior face and inner cavity. The first and second edges form a slit. The slit runs the entire circumference of the cover. In this manner, the cover fits over the steering wheel. The cover supports a primary wireless signal transmitter. The primary wireless signal transmitter has a power source. The power source is coupled to the first edge of the outer face of the steering wheel cover. The cover supports an elastomeric, flexible and resilient tube. The resilient tube has an exterior surface. The tube is coupled to the entire first edge of the exterior face of the cover. The tube has a hollow bore. The hollow bore runs the entire distance of the tube. The tube has a top region. The tube also has a bottom region. A first flat wire is secured within the bore. A second toothed wire is secured within the bore. The second wire is toothed and is circumferentially offset diametrically spaced from the first flat wire by 180 degrees. The first wire is a negative conductor, preferably. The first wire runs along the top region. The second wire is a positive conductor, preferably. The second wire runs along the bottom portion. The first and second wires are spaced away from each other when in the resting state. The first and second wires are electrically coupled to the wireless primary signal transmitter. The tube has a ridge. The ridge runs the entire distance of the exterior surface of the tube and faces away from the exterior face of the cover. The ridge is adapted to facilitate the activation of the system. Activation occurs when the ridge on the tube is compressed by the thumb or thumbs of a driver of the vehicle. The first and second wires are then in contact and cause a closing of a circuit. In this manner, the primary signal transmitter generates a wireless signal. The steering wheel cover has a plurality of gripping regions. Last provided is a trailer brake processor. The trailer brake processor has a trailer brake actuating switch. The trailer brake actuating switch is electrically coupled with the brakes of the trailer via the connection made between the secondary wired transmitter of the vehicle and the secondary wired receiver of the trailer. The trailer brake processor is coupled to the dashboard of the vehicle and coupled to the vehicle's electrical and braking systems. The trailer brake processor has a primary wireless signal receiver. The primary wireless signal receiver receives signals from the primary wireless signal transmitter. The primary wireless signal receiver is coupled to the trailer brake actuating switch. A user can trigger the switch from the steering wheel cover by applying thumb pressure to the ridge on the tube. A spring urged manual switch on the trailer brake processor is an alternate operational component. In this manner, a user may, instead, activate the trailer brake actuating switch directly.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is, therefore, the primary object of the present invention to help prevent injury or death and property loss.

It is another object of the present invention to provide a new and improved trailer brake control system which has all of the advantages of the prior art trailer and brake combinations of known designs and configurations and none of the disadvantages.

It is another object of the present invention to provide a new and improved trailer brake control system which may be easily and efficiently manufactured and marketed.

It is further object of the present invention to provide a new and improved trailer brake control system which is of durable and reliable constructions.

An even further object of the present invention is to provide a new and improved trailer brake control system which is susceptible of a low cost of manufacture with regard to both materials and labor, and which accordingly is then susceptible of low prices of sale to the consuming public, thereby making such trailer brake control system economically available to the buying public and encompassing recreational trailers as well as commercial trailers.

Even still another object of the present invention is to provide a trailer brake control system for rapidly and instinctively applying a braking force only to trailer brakes in emergency situations.

Lastly, it is an object of the present invention to provide a new and improved trailer brake control system comprising a trailer. The trailer has brakes. The trailer also has a secondary electrical receiver. A towing vehicle is also provided. The vehicle has a steering wheel. The vehicle also has a secondary electrical transmitter. A steering wheel cover, supporting a primary wireless signal transmitter, is provided. The wireless signal transmitter has a power source and a flexible torus-shaped tube. The tube has a hollow bore. Secured within the bore are one flat negative wire and one toothed positive wire, offset from each other. Both wires are coupled to the primary wireless signal transmitter. A trailer brake processor is provided next. The brake processor has a trailer brake actuating switch. The actuating switch is electrically coupled with the brakes of the trailer. A primary wireless signal receiver is coupled to the actuating switch and adapted to receive signals from the primary wireless signal transmitter. A manual slide lever or button functioning as a trigger is also coupled to the actuating switch as another method of only applying the trailer brakes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 32 is a front elevational view showing the system using positive and negative insulated wires actuated by switches.

The same reference numerals refer to the same parts throughout the various Figures.

DESCRIPTION OF THE PREFERRED EMBODIMENT

Figure 1:
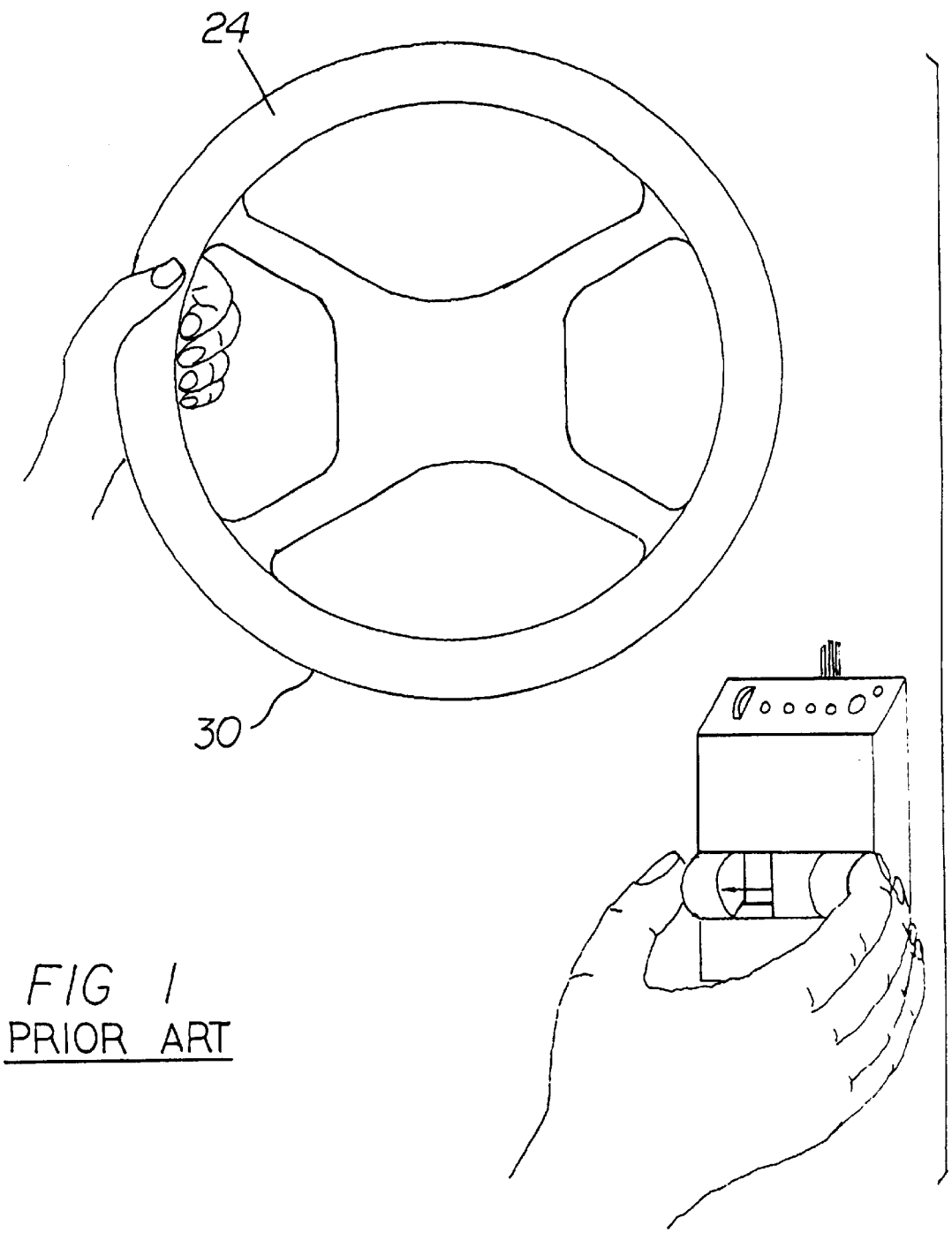
FIG. 1 is a front view of a steering wheel associated with the trailer brake control system of the prior art.
Figure 2:
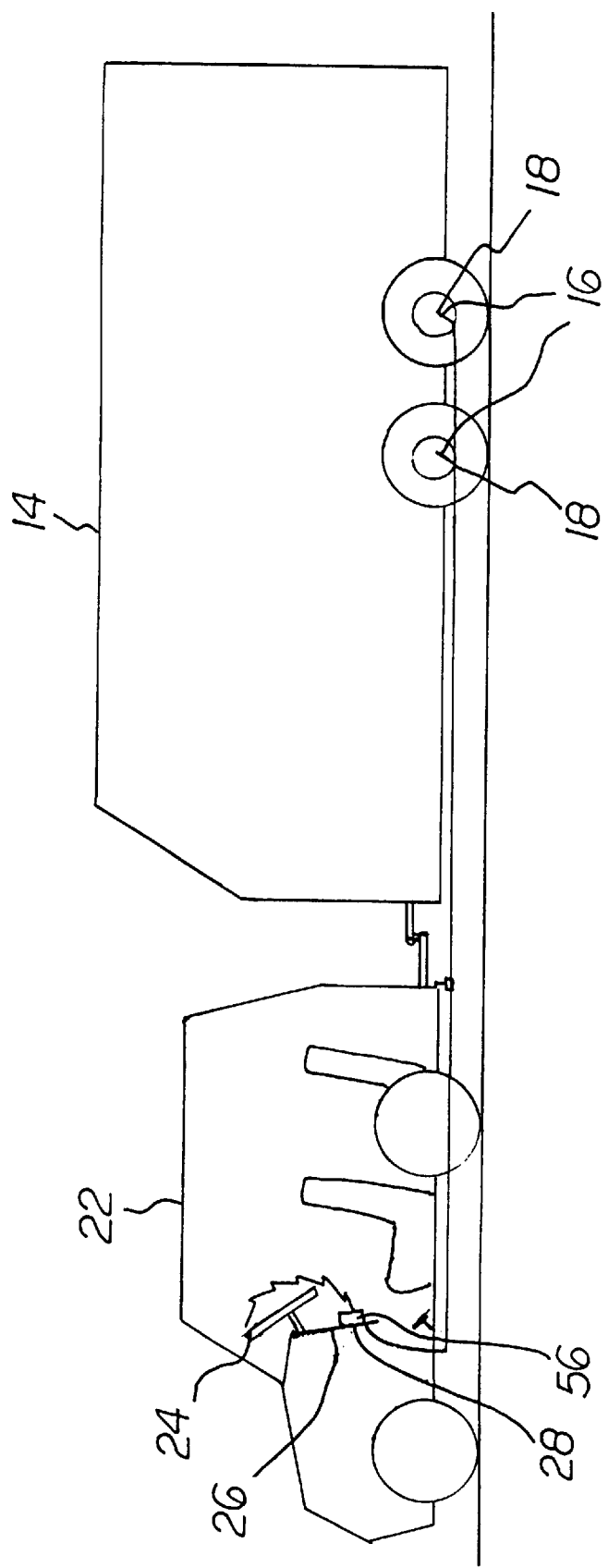
FIG. 2 is a side elevational view of a trailer brake system associated with the present invention.
Figure 3:
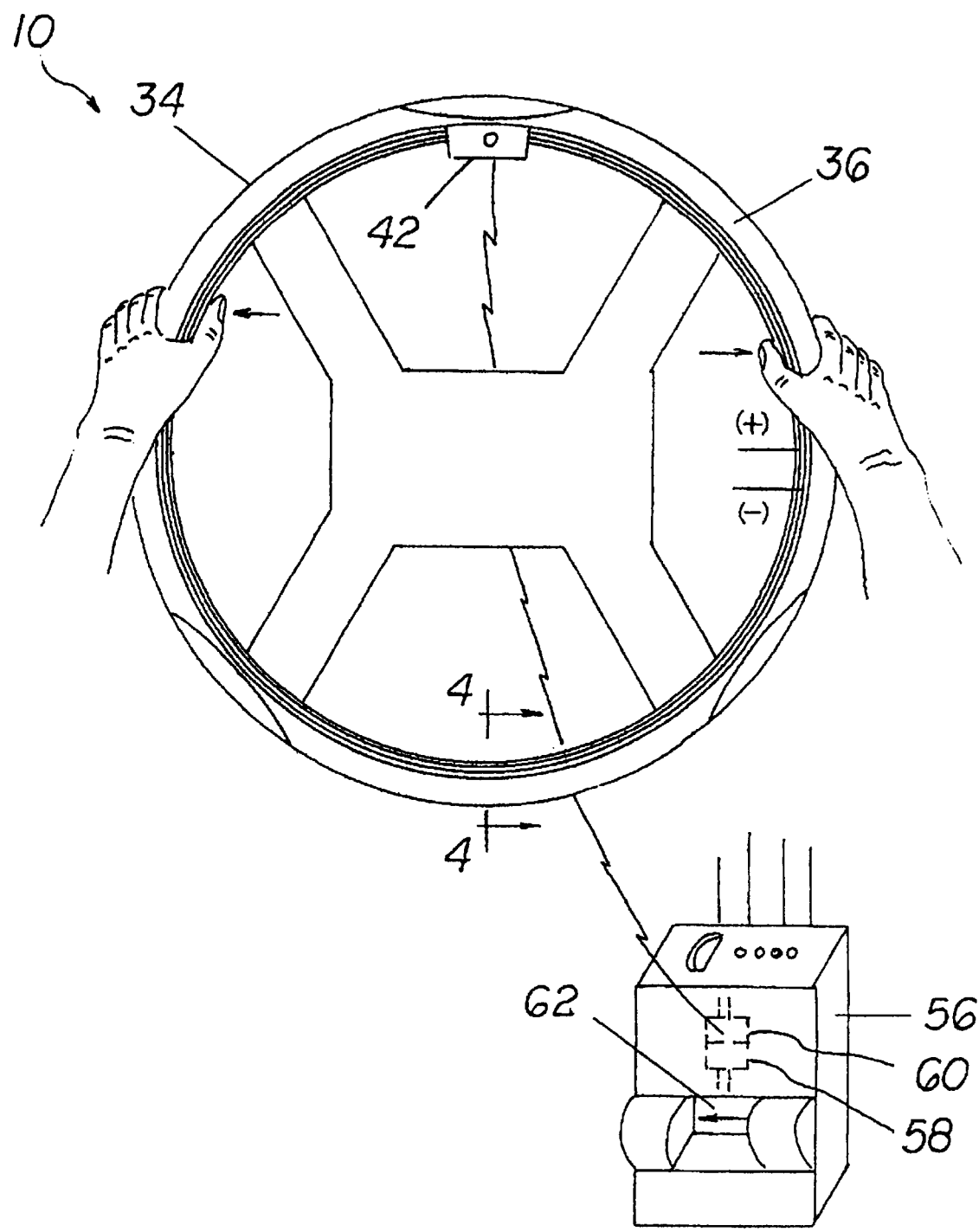
FIG. 3 is a perspective illustration of a trailer brake processor and steering wheel cover associated with the present invention.
Figure 4:
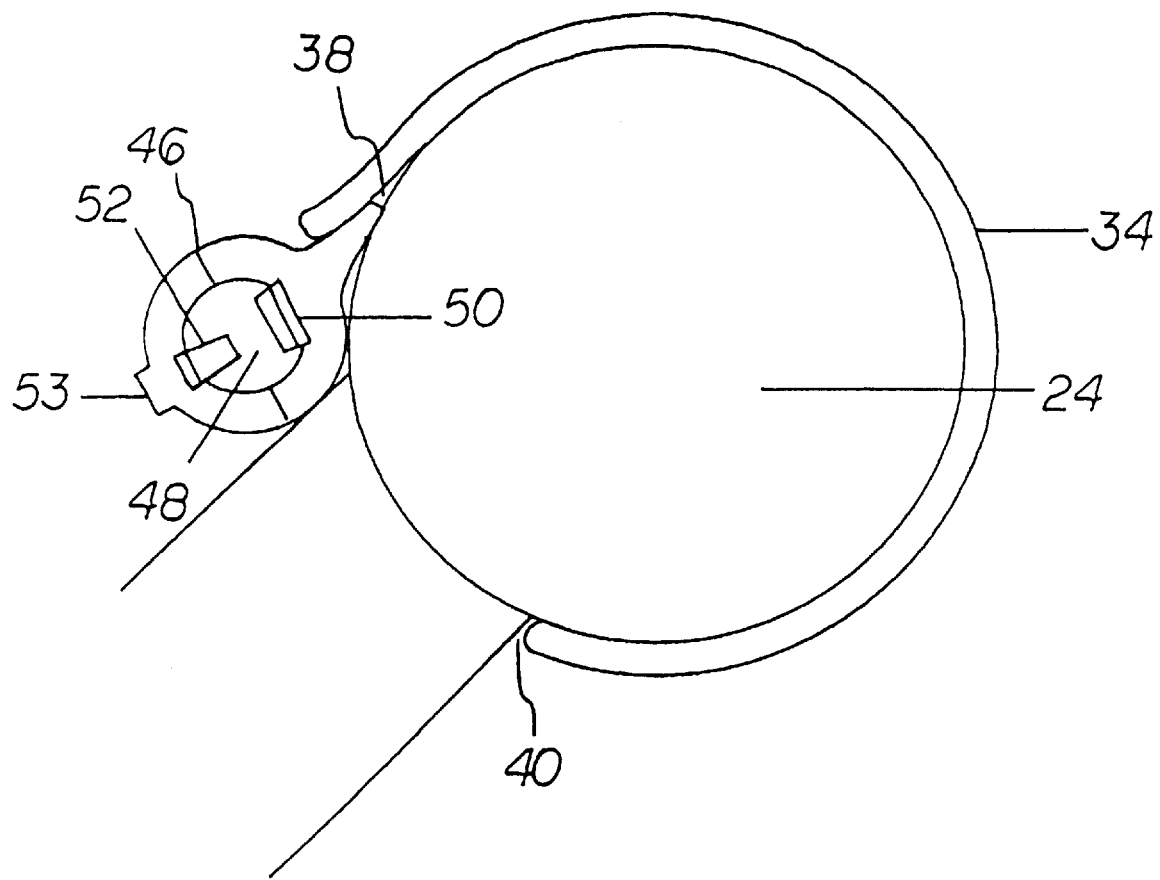
FIG. 4 is a cross sectional view of a steering wheel and steering wheel cover with attached flexible tube of the present invention.
Figure 5:
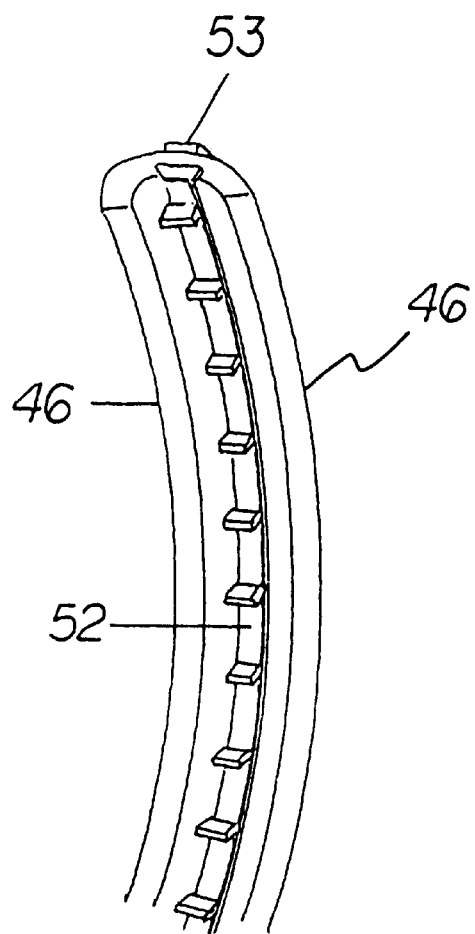
FIG. 5 is a perspective illustration of the bottom region of the flexible tube associated with the present invention.
Figure 6:
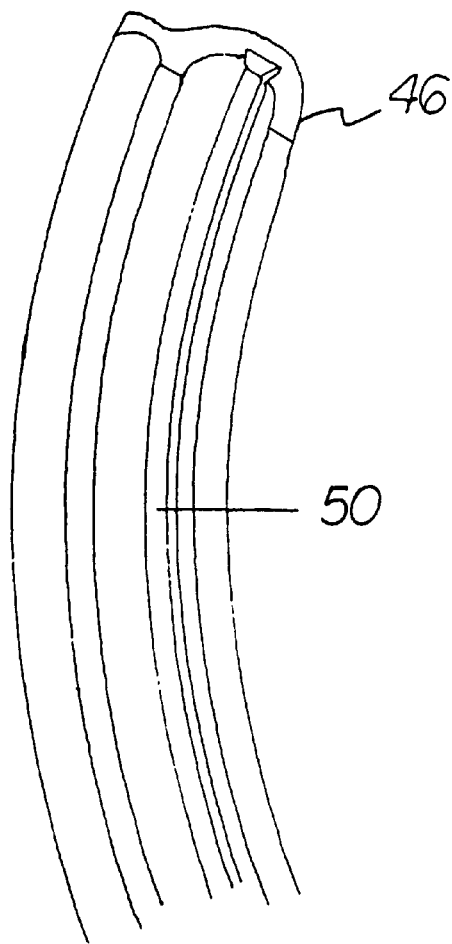
FIG. 6 is a perspective illustration of the top region of the flexible tube associated with the present invention.
Figure 7:
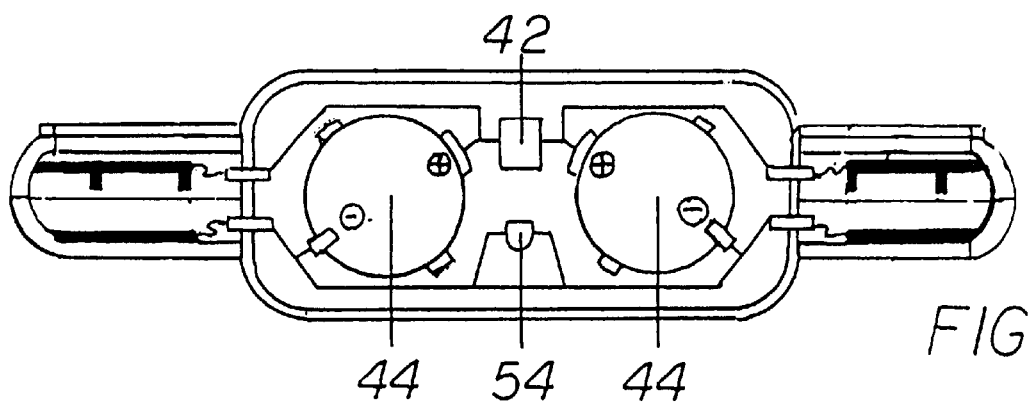
FIG. 7 is an cross sectional view of the case showing the primary wireless transmitter and warning or signal light of the present invention.
Figure 8:
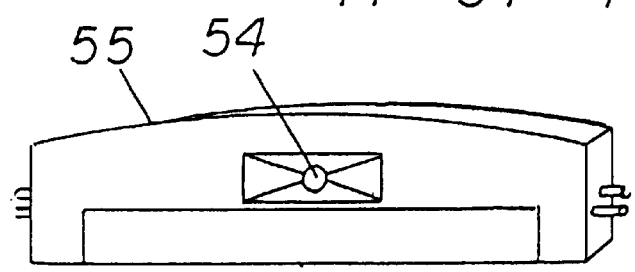
FIG. 8 is perspective view of the case associated with the components of FIG. 7.
Figure 9:
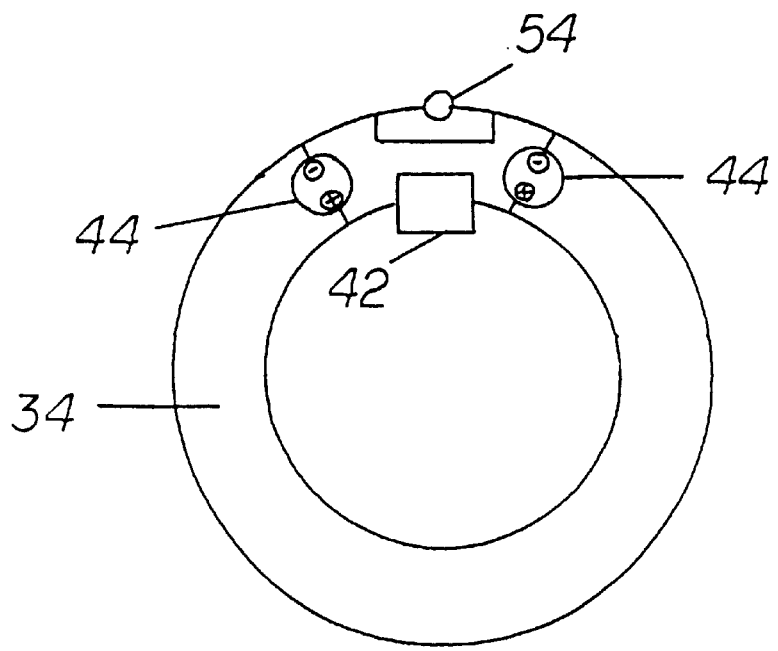
FIG. 9 is a schematic illustration of the steering wheel cover showing the power source, transmitter and warning or signal light of FIGS. 7 and 8.
Figure 10:
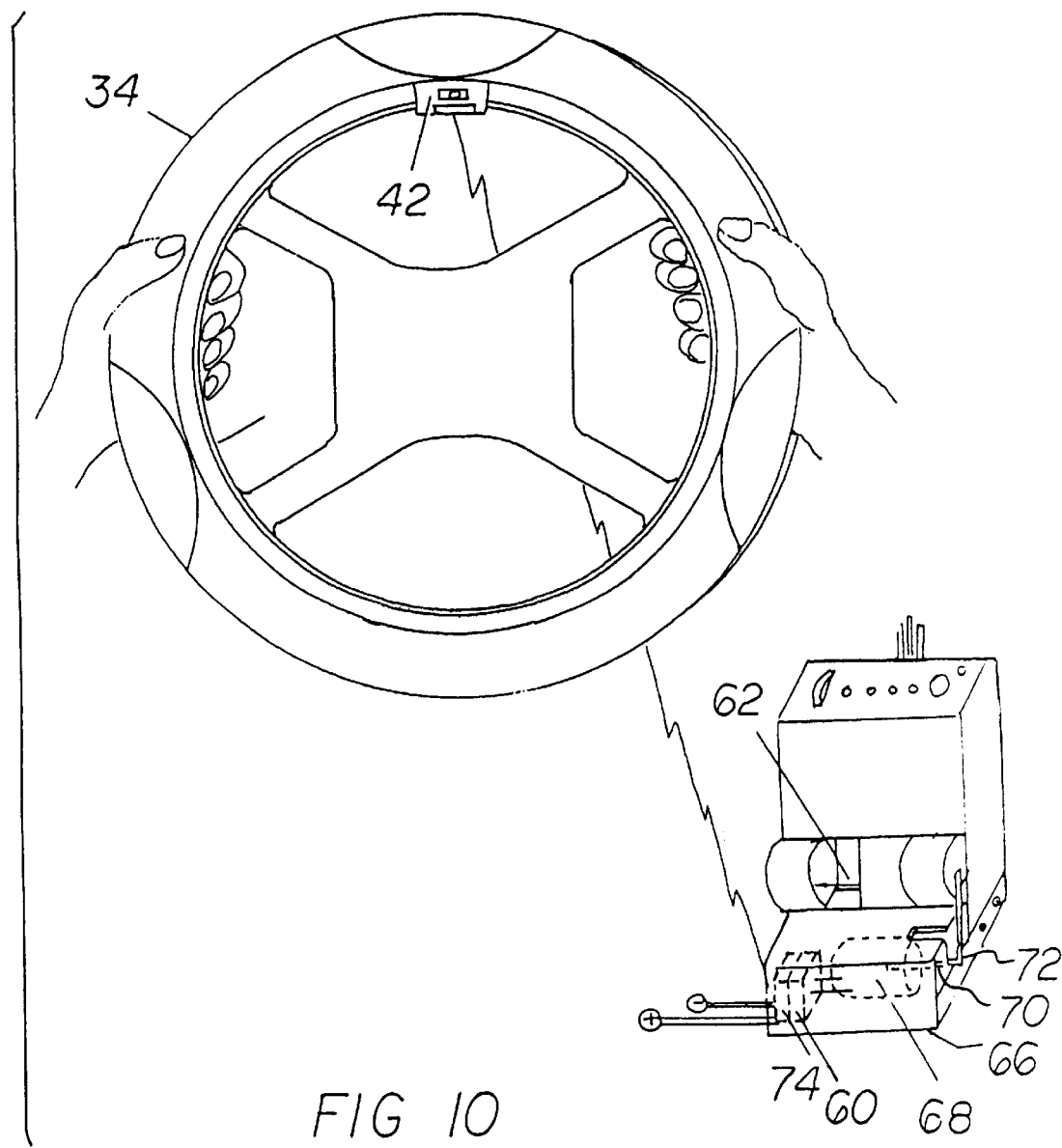
FIG. 10 is front view of an alternative embodiment of the present invention.

With reference now to the drawings, and in particular to FIGS. 2–9 thereof, the preferred embodiment of the new and improved trailer brake control system embodying the principles and concepts of the present invention and generally designated by the reference numeral 10 will be described.

The present invention, the trailer brake control system 10 is comprised of a plurality of components. Such components in their broadest context include a trailer having electrically actuated brakes, a towing vehicle, a steering wheel cover, and a trailer brake processor. Such components are individually configured and correlated with respect to each other so as to attain the desired objective.

First provided is a trailer 14. The trailer has brakes 16 and a secondary electrical receiver 18.

Provided next is a towing vehicle 22. The towing vehicle has a steering wheel 24 and a dashboard 26. The vehicle also has a secondary electrical transmitter 28. The steering wheel is in a torus-shaped configuration with an outer periphery 30. The secondary transmitter of the vehicle is electrically coupled with the secondary receiver of the trailer, primarily using wires but being adapted to other known methods. The vehicle is adapted to pull the trailer.

Next provided is a steering wheel cover 34. The steering wheel cover is coupled around the outer periphery of the steering wheel of the vehicle. The steering wheel cover has an elastomeric, flexible, resilient, hollow sheath 36. The sheath is in a circular configuration. The sheath has a first edge, second edge, interior face, exterior face and inner cavity 38. The first and second edges form a slit 40. The slit runs the entire circumference of the cover. In this manner, the cover fits over the steering wheel cover. The cover supports a primary wireless signal transmitter 42. The primary wireless signal transmitter has a power source 44. The power source is coupled to the steering wheel cover. The cover has an elastomeric, flexible and resilient tube 46. The resilient tube has an exterior surface. The tube is coupled to the entire first edge of the exterior face of the cover. The tube has a hollow bore 48 with an insulating air space. The hollow bore runs the entire distance of the tube. The tube has a top region. The tube also has a bottom region. These regions of the tube can be made of separate components that are coupled together or as a single component. Although the tube with the electrical wires is shown as formed of a two piece construction to facilitate fabrication, the tube may be fabricated as a single piece with the electrical wires formed securely within.

A first flat wire 50 is secured within the bore. A second toothed wire 52 is secured within the bore. The second wire is formed with fingers or teeth circumferentially offset diametrically spaced from the first flat wire by 180 degrees. The first wire is a negative conductor. The first wire runs along the top region. The second wire is a positive conductor. The second wire runs along the bottom portion. The first and second wires are spaced away from each other when in the resting state. The first and second wires are electrically coupled to the primary signal transmitter. The wire may be formed with electrically conductive fingers or teeth to facilitate the electrical contact of the wire during the activation of the system. The tube has a ridge 53. The ridge runs the entire distance of the exterior surface of the tube and faces away from the exterior face of the cover. The ridge is adapted to facilitate the activation of the system. Activation occurs when the ridge on the tube is compressed by the thumb or thumbs of a driver of the vehicle. The system only activates as long as the driver is applying force on the tube. The first and second wires are then in contact and cause a closing of a circuit. In this manner, the primary signal transmitter generates a wireless signal. The steering-wheel cover has a plurality of gripping regions. A generic cover is merely a means for mounting the present invention to a steering wheel. A unintentional braking warning light 54 is further provided to indicate when the system is being activated and also indicates battery strength. The power source, transmitter and warning light all reside in a case 55 mounted to the steering wheel cover.

Last provided is a trailer brake processor 56. The trailer brake processor has a trailer brake actuating switch 58. The trailer brake actuating switch is electrically coupled with the brakes of the trailer via the connection made between the secondary transmitter of the vehicle and the secondary receiver of the trailer. The trailer brake processor is coupled to the dashboard of the towing vehicle and is also coupled to the electrical and braking systems. The trailer brake processor has a primary wireless signal receiver 60. The primary signal receiver receives signals from the primary signal transmitter on the steering wheel cover. The primary wireless signal receiver is coupled to the trailer brake actuating switch. A user can trigger the switch from the steering wheel cover by applying thumb pressure on the tube ridge. A spring urged manual switch 62 on the trailer brake processor is an alternate operational component. In this manner, a user may activate the trailer brake actuating switch directly.

Although the primary signal from the steering wheel to the processor on the dashboard is preferably wireless by radio waves, with conventional antennas at the transmitter and receiver, the secondary signal from the processor to the brakes of the trailer is preferably by a wiring harness with a connector between the trailer the towing vehicle. Appropriate coder/decoder components are preferably utilized in association with the wireless signals. Such components preclude extraneous signals from improperly activating or interfering with the present systems. Conversely, such components preclude the present system from activating or interfering with extraneous systems.

For normal stops or slowdown the trailer brake processor synchronizes the trailer brakes with the towing vehicle brake. Drivers accomplishes this by making test stops and adjusting the controller. However, in the event of fish-tailing or swaying, caused by the vortex of passing semi-trailers, other large vehicles, a tire blowout, or cross winds, it is necessary to quickly apply trailer brakes only. This brings the trailer back in line with the towing vehicle. Applying the towing vehicle brake almost always causes the entire rig to jack-knife and possibly overturn. The prior art requires the driver to remember to remove one hand form the steering wheel, grope for, hopefully find the manual slide and hand activate it while under the stress of a towing vehicle being turbulent. Upon the first indication of fish-tailing, the present invention requires only the thumb force of the driver to rapidly and instinctively compress the flexible tube thereby activating the system. Even a passenger, in the event of driver incapacity, could steer and activate the system simultaneously. The present invention would enable one armed drivers to safely activate the system.

An alternate embodiment of the invention includes a trailer brake control system as set forth hereinabove. Also included is a solenoid housing 66. The solenoid housing is coupled to the processor adjacent to the manual switch. Further included is a solenoid 68. The solenoid has a movable piston 70. The movable piston has an activation arm 72. The activation arm is coupled to the movable piston. The activation arm abuts the manual switch. The solenoid housing has an associated primary wireless signal receiver 74 and a switching assembly operated by the primary signal receiver. The primary wireless signal receiver is electrically coupled with the solenoid. The alternative embodiment having a light to warn the driver of unintentional trailer braking as well as providing a means for checking battery strength.

Figure 11:
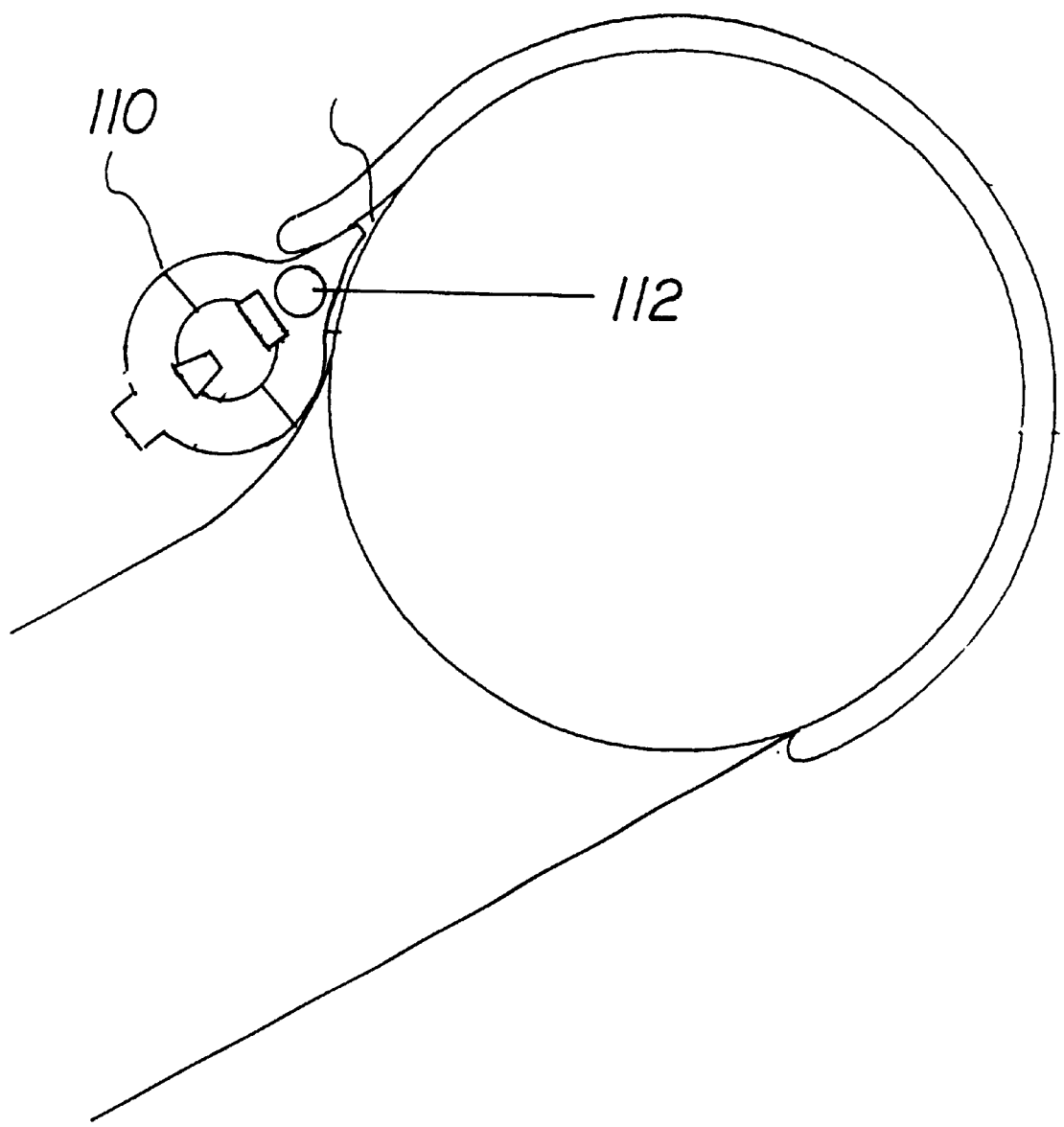
FIG. 11 is a cross sectional view of a modified tube.
Figure 12:
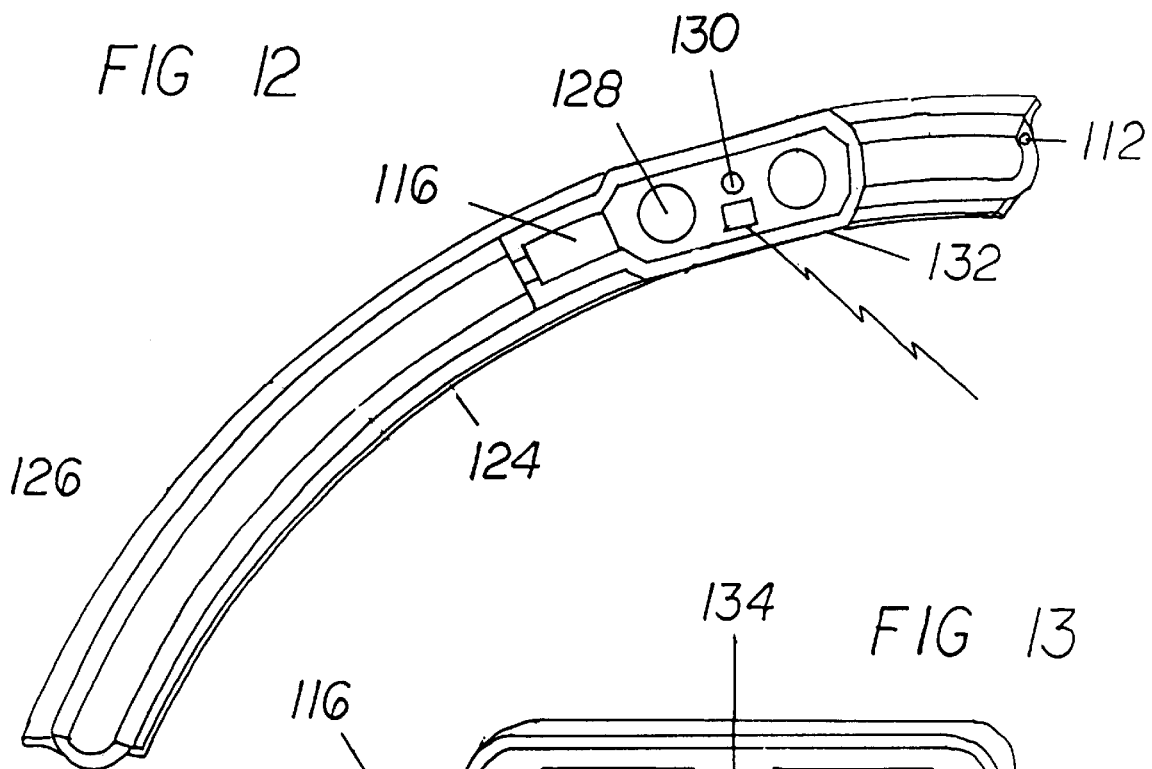
FIGS. 12 through 15 illustrate an alternate embodiment of the invention.
Figure 13:
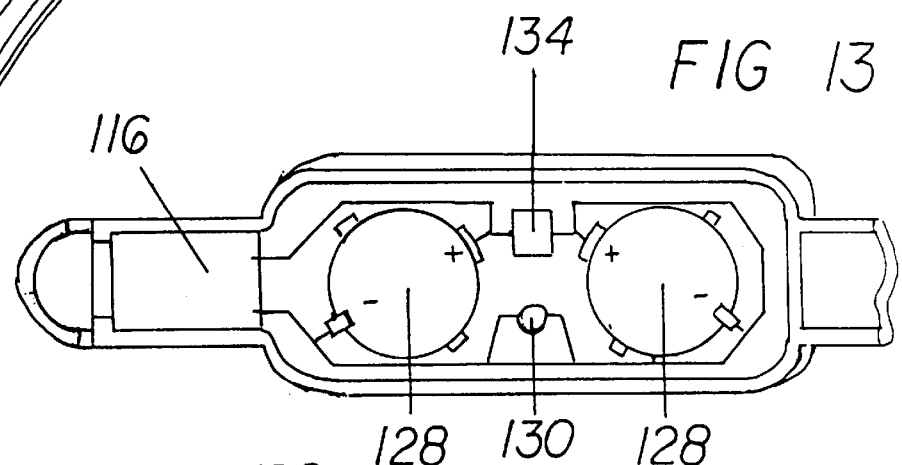
Figure 14:
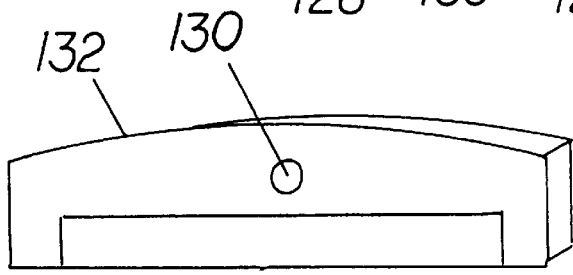

A modified tube 110 is shown in FIG. 11. The tube is essentially the same as in the prior embodiments except that a stiffener wire 112 is added around the entire circumference of the steering wheel to preclude improper bending and twisting of the flexible tube.

Figure 15:
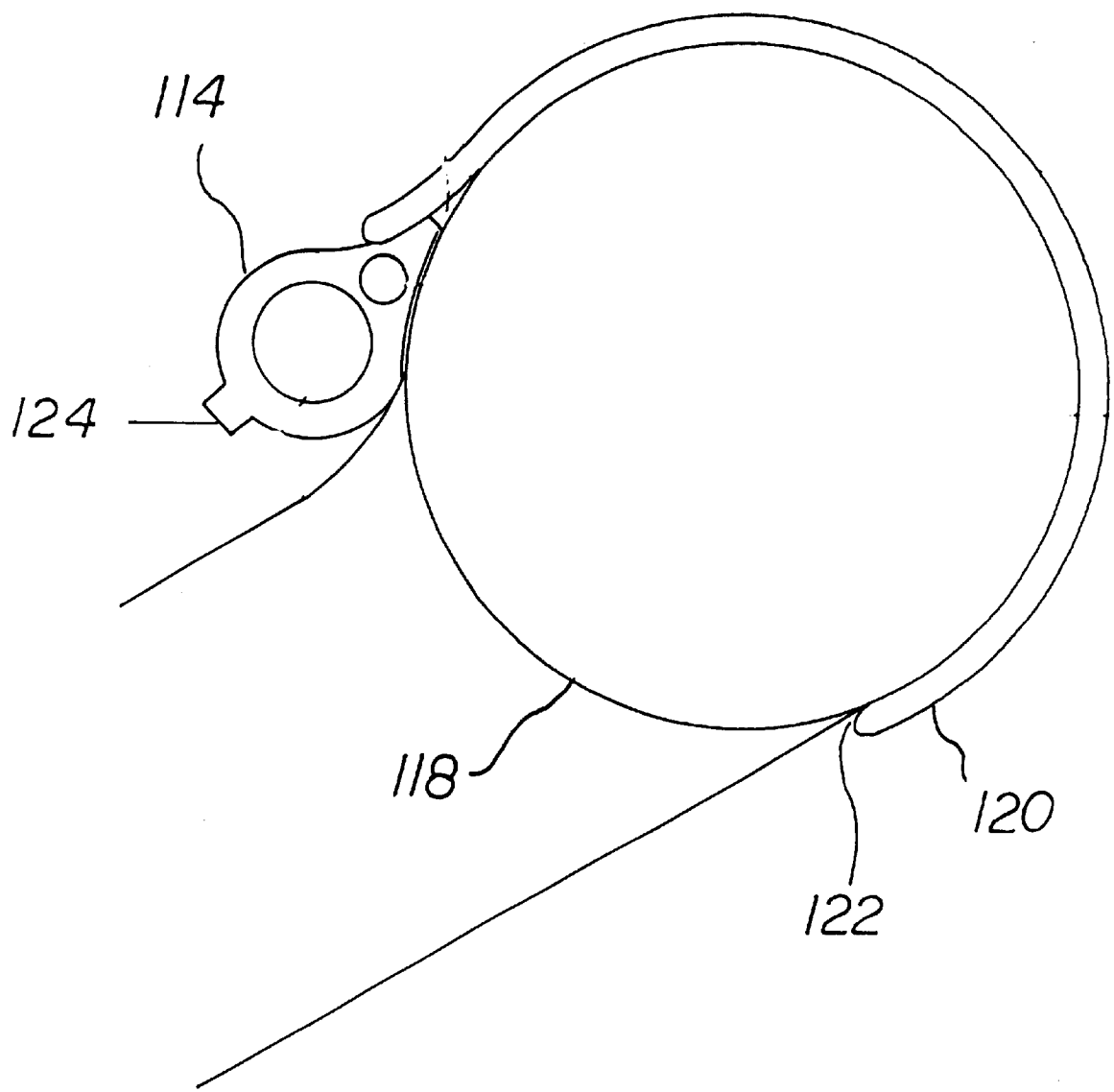

An alternate embodiment of the invention is shown in FIGS. 12 through 15. In such embodiment, the squeezing of the tube 114 around the steering wheel actuates a pressure sensitive switch 116. As can be seen in FIG. 15, the steering wheel 118 has a cover 120. The ends of the cover constitute slits 122 adapted to receive the flexible pneumatic tube 114. The flexible pneumatic tube has an enlarged portion or ridge 124 to assist the driver in identifying the location of the tube and its components. With regard to FIGS. 12–15, there is shown in greater detail the flexible tube 114 and an attachment flange 126. The space within tube 114 is coupled with regard to a pressure sensitive switch whereby the switch is activated and deactivated by pressing the tube 114. The switch contains a power source such as a battery 128 and a pilot light 130 indicating the ON orientation. These components, including the switch, are in a case 132 and include a transmitter 134.

Figure 16:
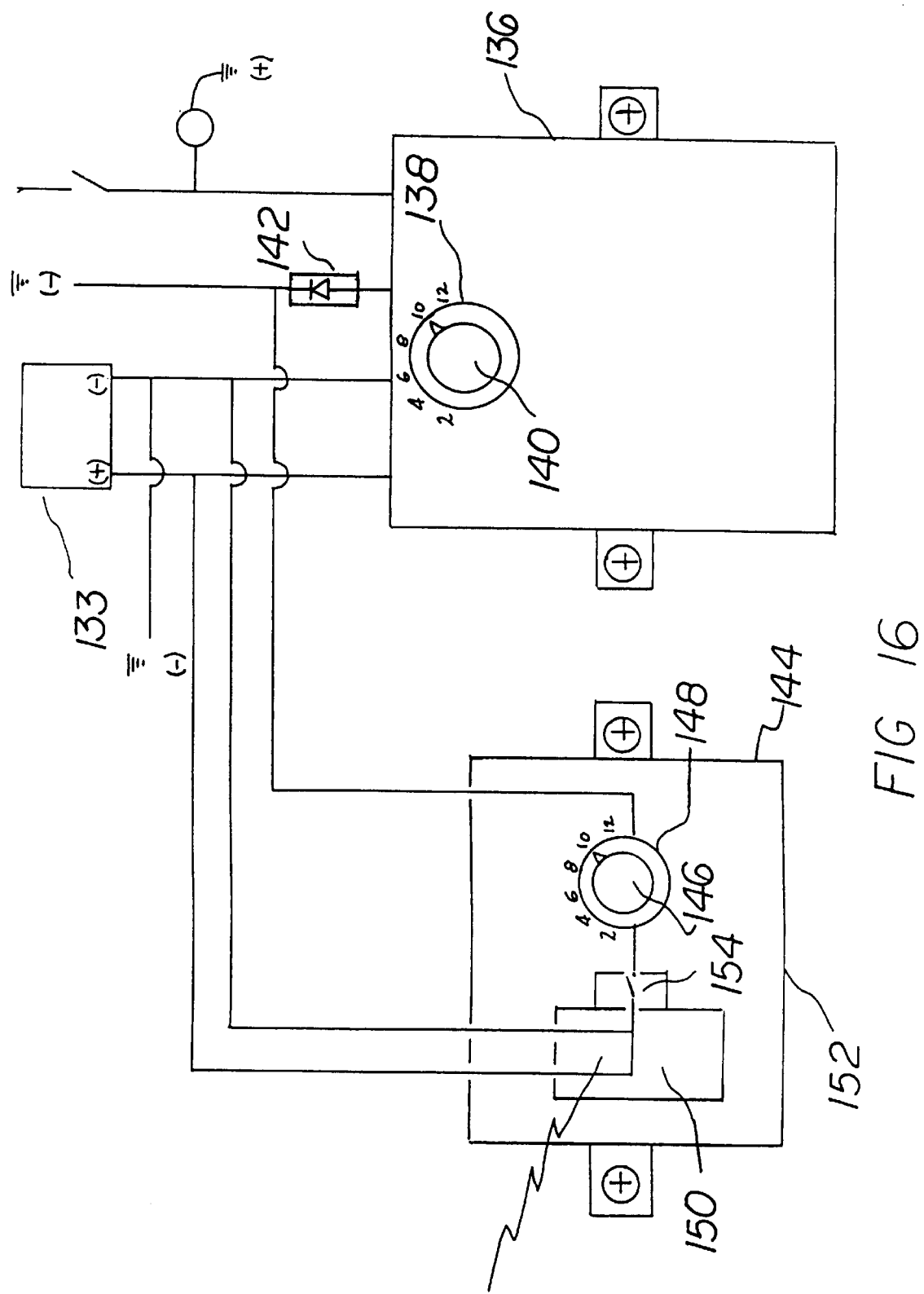
FIG. 16 is an electrical diagram of a retrofit circuit.
Figure 16A:
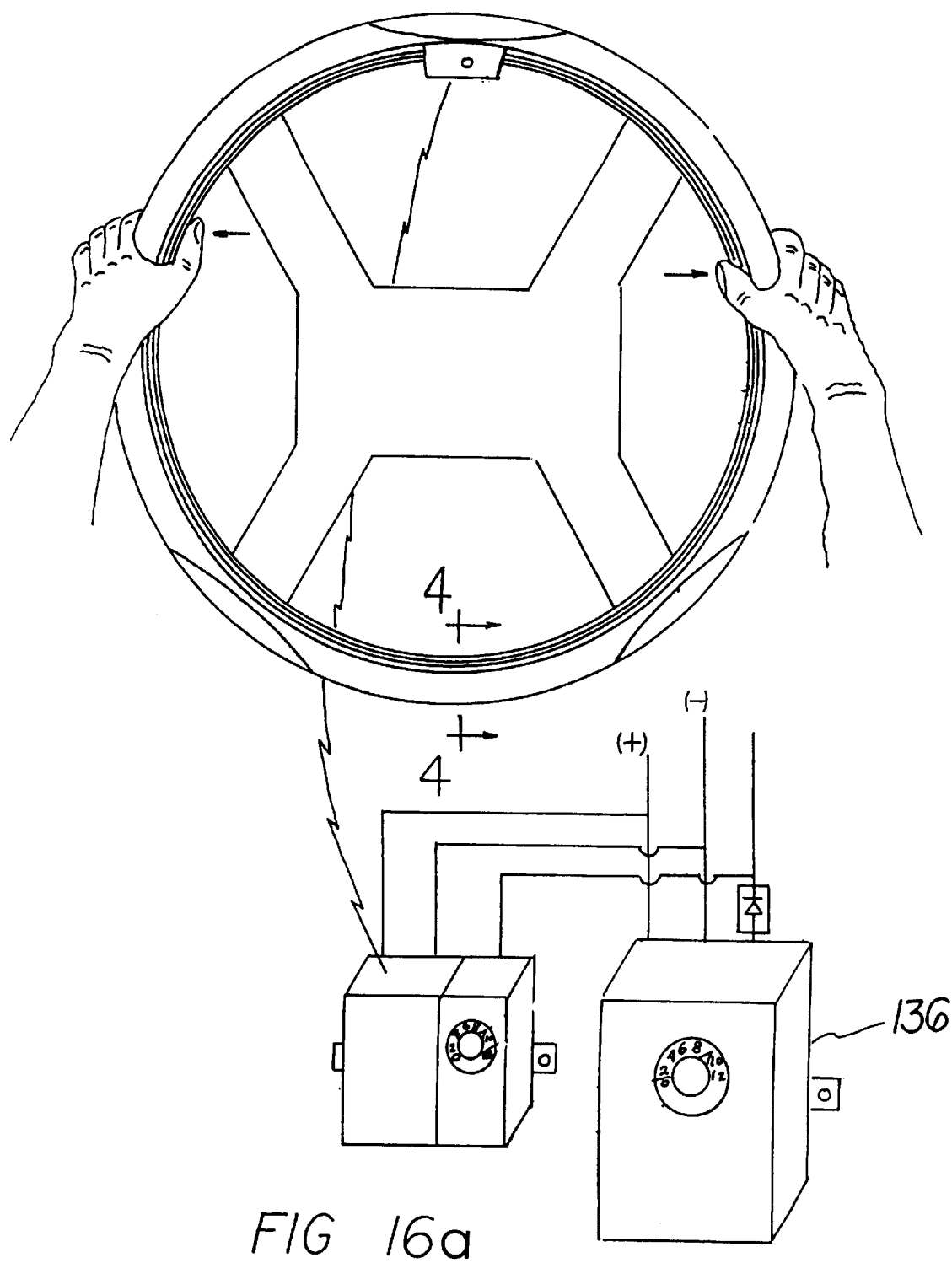
FIG. 16*a* is a view similar to FIG. 16 but showing one conroller with a retrofit.

FIG. 16 is a retrofit circuit. There is a common power source, preferably the battery 133 of the vehicle. The battery is electrically coupled to a primary controller 136 which includes a voltage control 138 with a control knob 140 operable by the user. In association with the controller is a one-directional diode 142 coupled in the brake line. In addition to the primary voltage controller, there is a retrofit voltage controller 144 with a control knob 146 and a voltage control 148. Coupled with respect thereto is a receiver 150 positioned in a by-pass case 152. A switch 154 couples the voltage control and the receiver.

Figure 17:
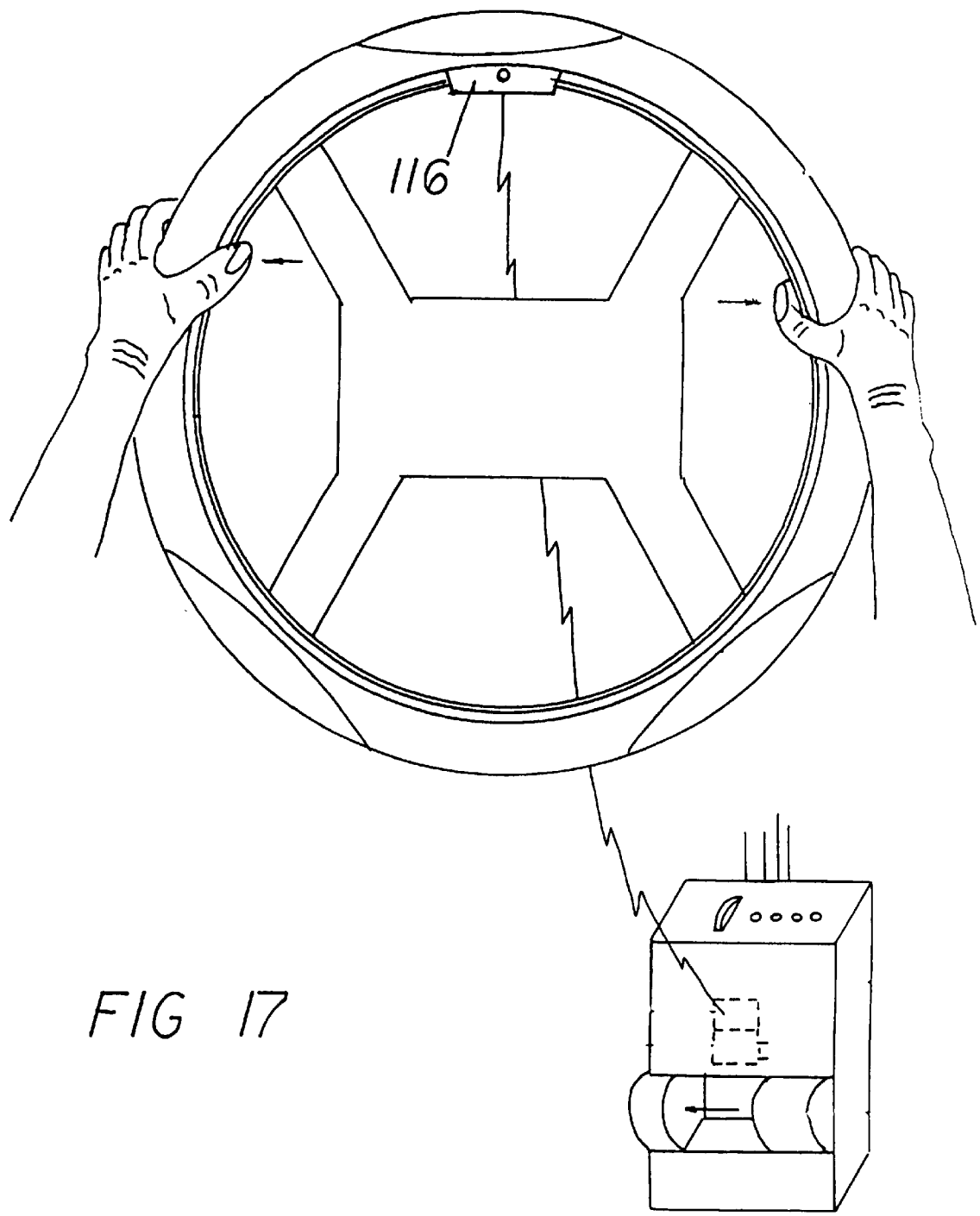
FIG. 17 is an elevational view similar to the primary embodiment of the FIGS. 1–10 illustrating the pressure sensitive switch as the actuation mechanism.

FIG. 17 is a system with a switch and receiver built into a main controller.

In an alternate embodiment of the invention, the pressure sensitive switch 116 is the actuation mechanism.

Figure 18:
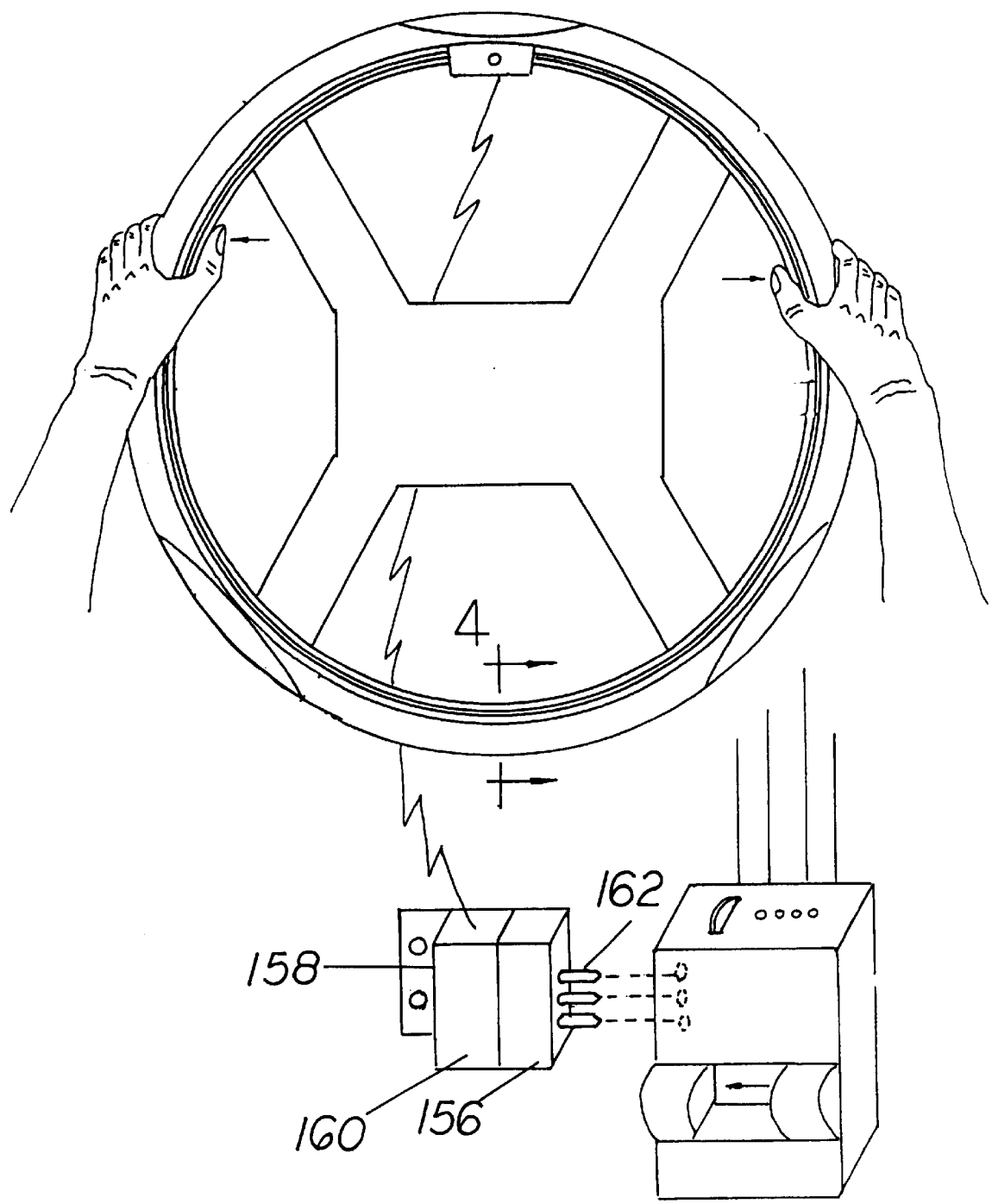
FIG. 18 is an elevational view similar to FIG. 17 adding a modular retrofit.

A modular retrofit 156 of the invention is shown in FIG. 18. This embodiment includes a retrofit case 158 with a receiver 160 and prongs 162 for coupling the receiver at the brakes into operative orientation.

Figure 19:
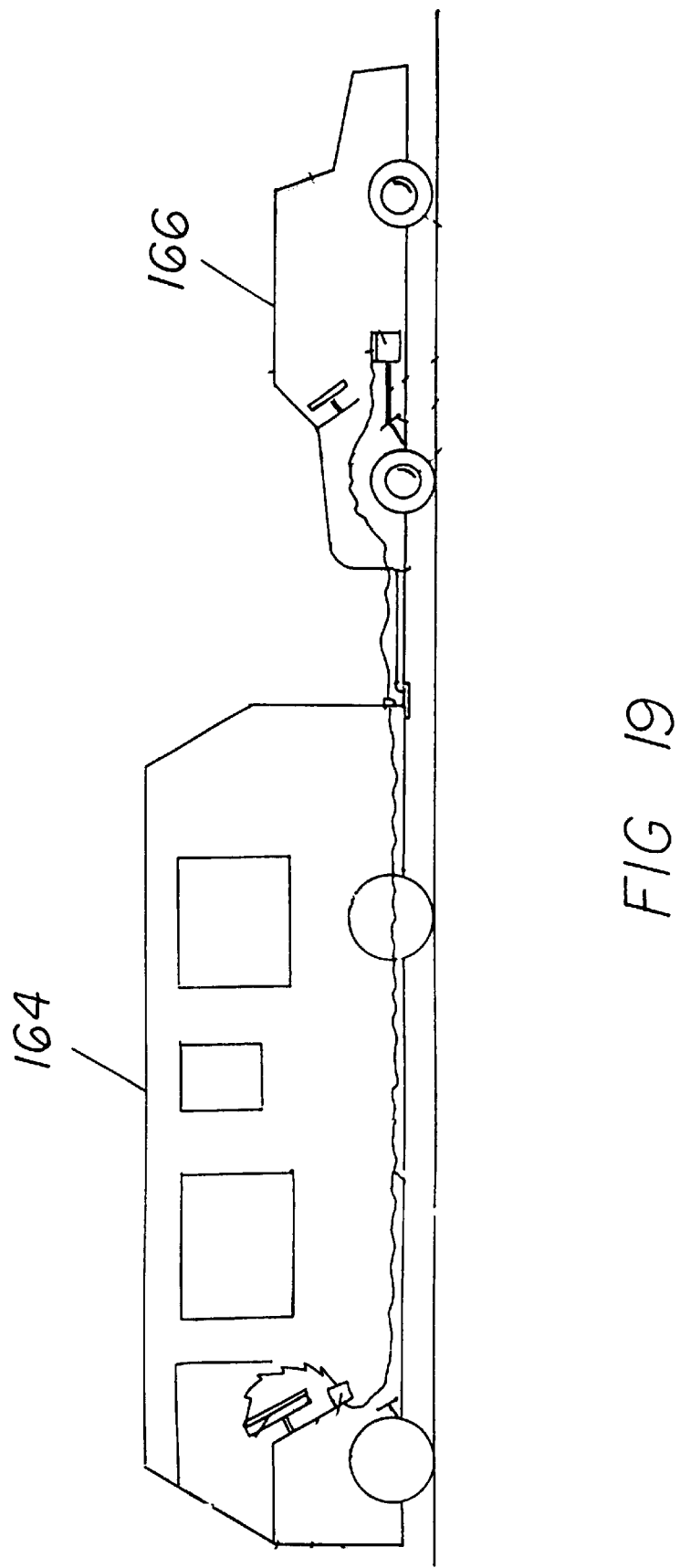
FIG. 19 is a side elevational view of a motor home towing a vehicle.

An example of towing flat is shown in FIG. 19. In this case all wheels of the motor home 164 and the towed vehicle 166 are on the ground.

Figure 20:
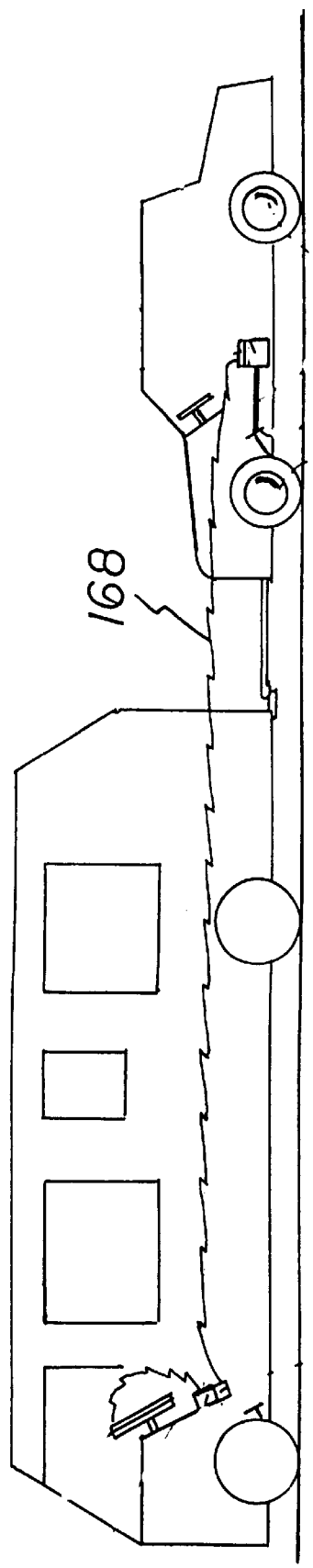
FIG. 20 is a side elevational view similar to FIG. 19 but utilizing radio waves.

An embodiment of the invention utilizes radio waves 168 is shown in FIG. 20.

Figure 21:
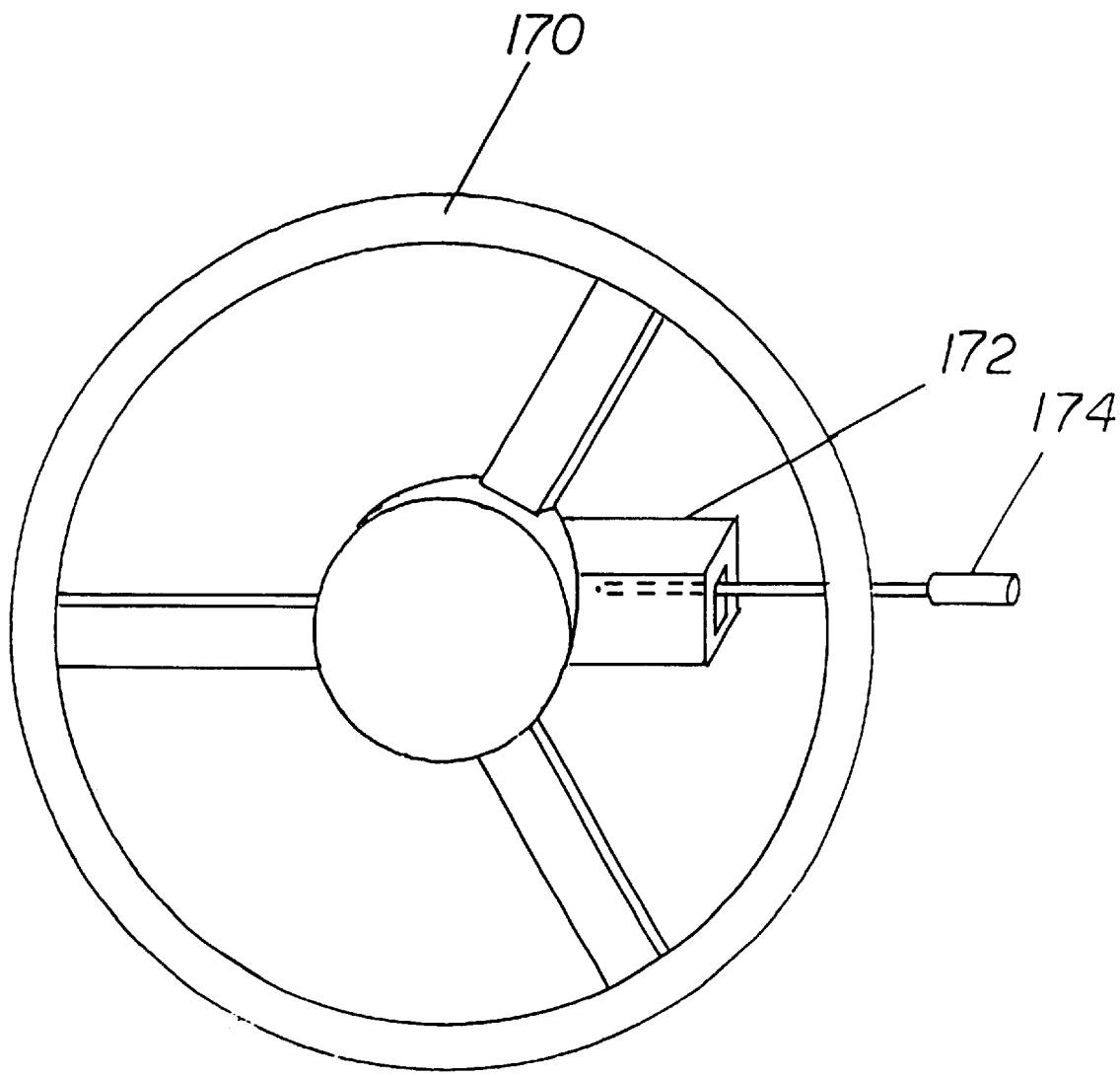
FIG. 21 is a front elevational view of a prior art steering wheel, trailer air brake controller and a manual override lever illustrating the basic manual override lever in its orientation with respect to the steering wheel.

A front elevational view of prior art is shown in FIG. 21. The steering wheel 170, trailer air brake controller 172 and a manual override lever 174 are shown. This figure illustrates the basic manual override lever in its orientation with respect to the steering wheel. Driving a semi is dangerous work. A semi driver needs all the control and safety he or she can get. In order to actuate just the trailer brakes, the driver must take the right hand off the steering wheel to move the manual override lever in a rather wide arc. If, in the event of requiring several rapid on/off actuations in order to get control in an emergency situation, one hand must be dedicated to that function while the other hand steers. This is not conducive to the safest driving. Also, in the event of emergency braking or a panic stop, four small brake lights are activated by glowing. These lights illuminate no brighter at 70 mph than at 7 mph. Also, in the event of a crash or other sudden emergency, there is usually no time to alert other semi drivers following via CB radio. For example, two recent crashes of over 100 vehicles in Virginia and Georgia were caused by sudden fog.

Figure 22:
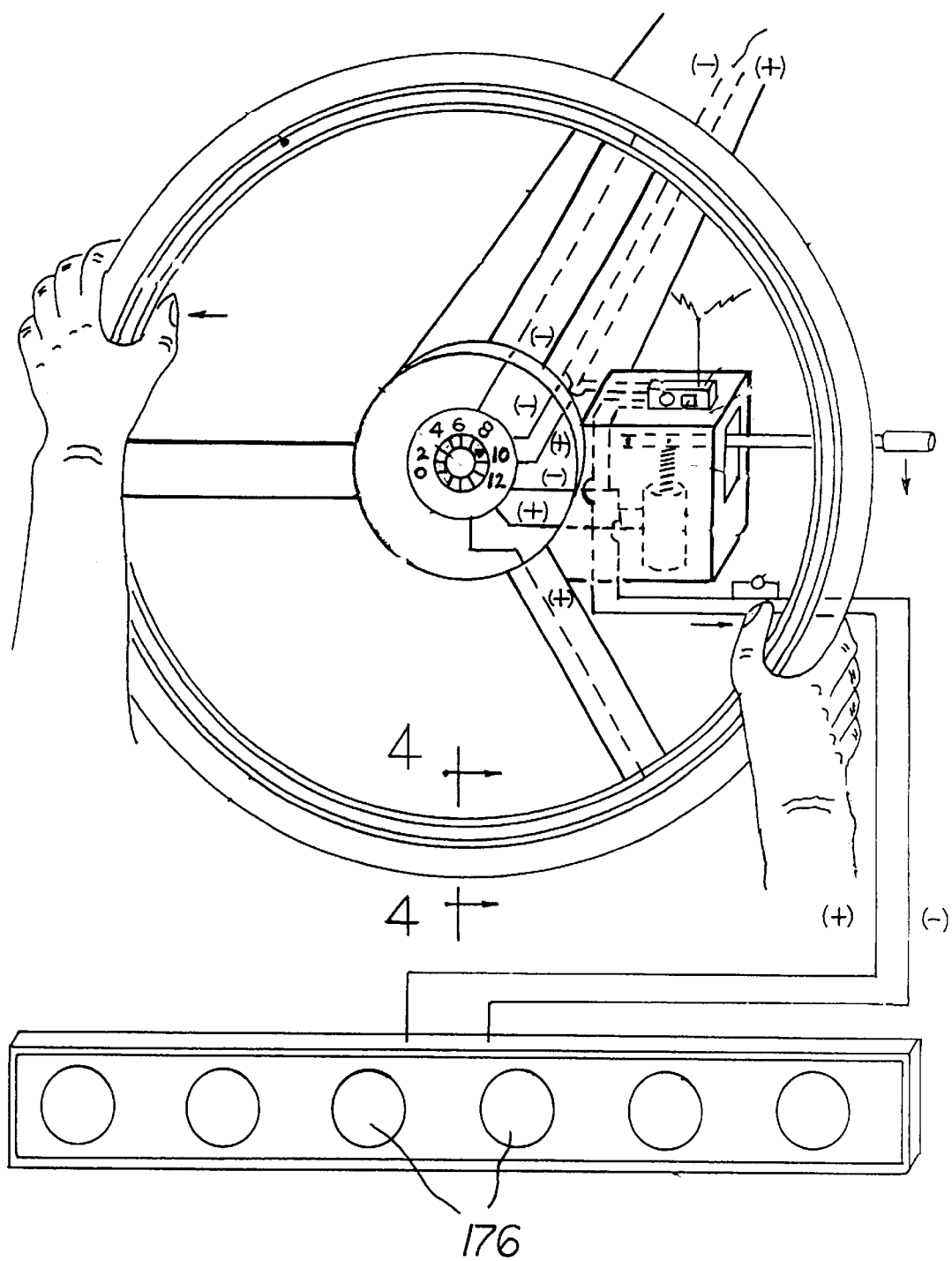
FIGS. 22 is an illustration of an alternate control system designed for hard-wired applications showing the coupling of the hand controls with anti-collision lights at the rear of the vehicle.
Figure 23:
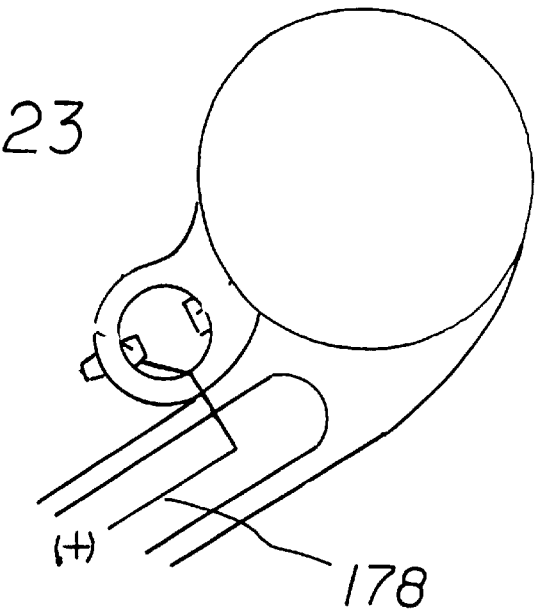
FIG. 23 shows a positive lead in the hollow of another spoke.
Figure 24:
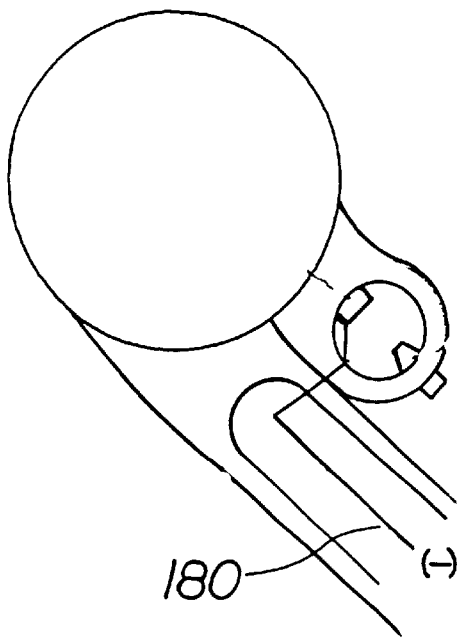
FIG. 24 shows a negative lead in the hollow of one spoke.
Figure 25:
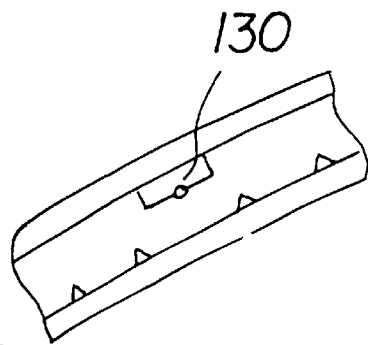
FIG. 25 is a light-emitting diode to indicate that the system is working.

An alternate control system designed for hard-wired application is shown in FIGS. 22 through 25. More specifically, FIG. 22 shows the coupling of the hand controls with anti-collision lights 176 at the rear of the trailer. It is adapted to provide the positive signal 178 for operating the lights. FIG. 23 shows a positive lead 178 in the hollow of one spoke while FIG. 24 shows a negative lead 180 in the hollow of another spoke. FIG. 25 is a light-emitting diode 130 to indicate that the system is working.

Figure 26:
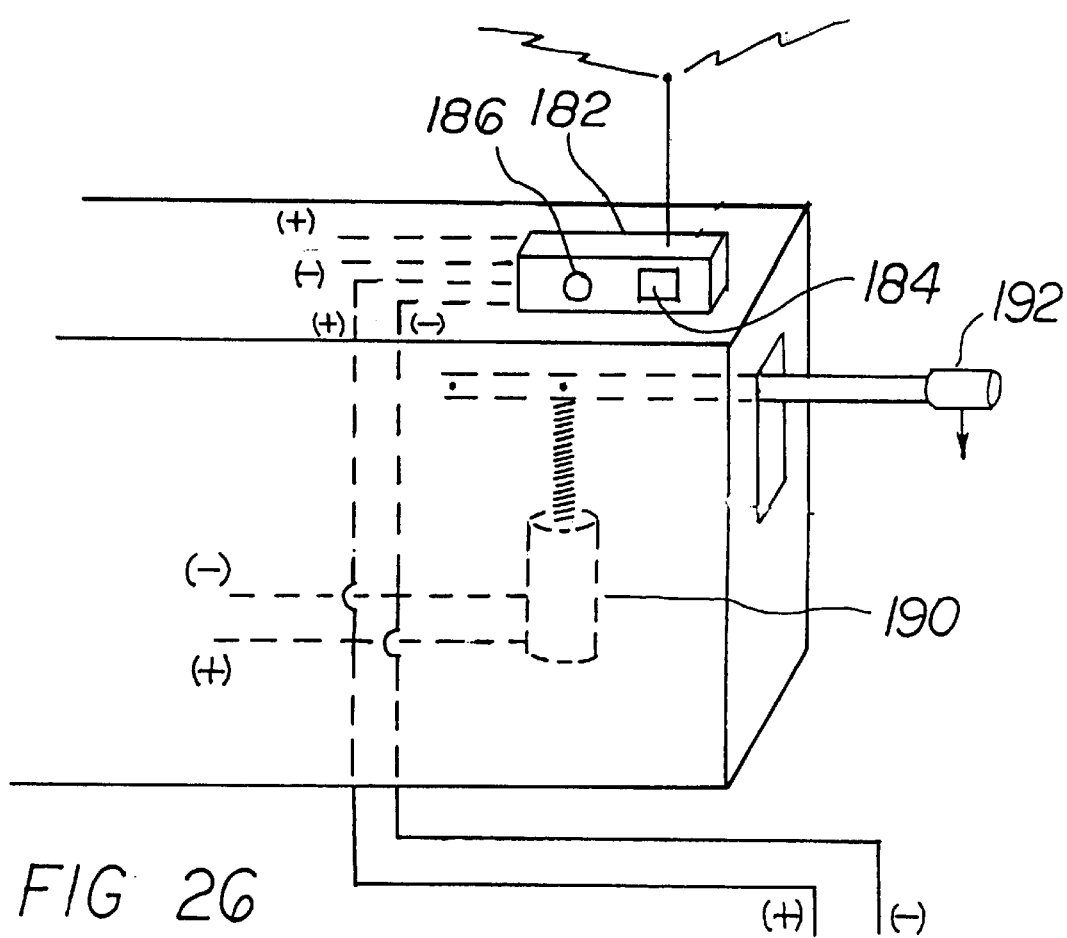
FIG. 26 is an illustration of the transceiver portion of alternate pneumatic embodiments.
Figure 27:
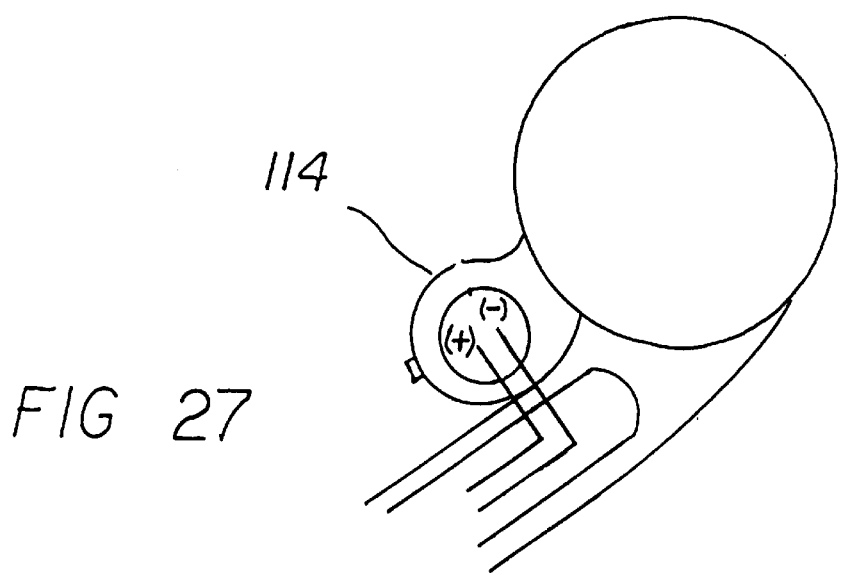
FIG. 27 is an illustration of a spoke of an alternate pneumatic embodiment of the invention.

A pneumatic embodiment of the invention is shown in FIGS. 26 and 27. FIG. 26 illustrates a transceiver 182 operable with either of the embodiments. The transceiver includes an on/off switch 184 and electrical indicator light 186. The receiver portion is wired continuously. The transceiver portion is activated by compressing the tube 114. The on/off switch is provided so as to not create a false alarm when testing the brake. A solenoid 190 is operative through the squeezing of the tube on the steering wheel to provide another voltage against the action of the spring to depress the lever 192 which is a manual override lever.

Figure 28:
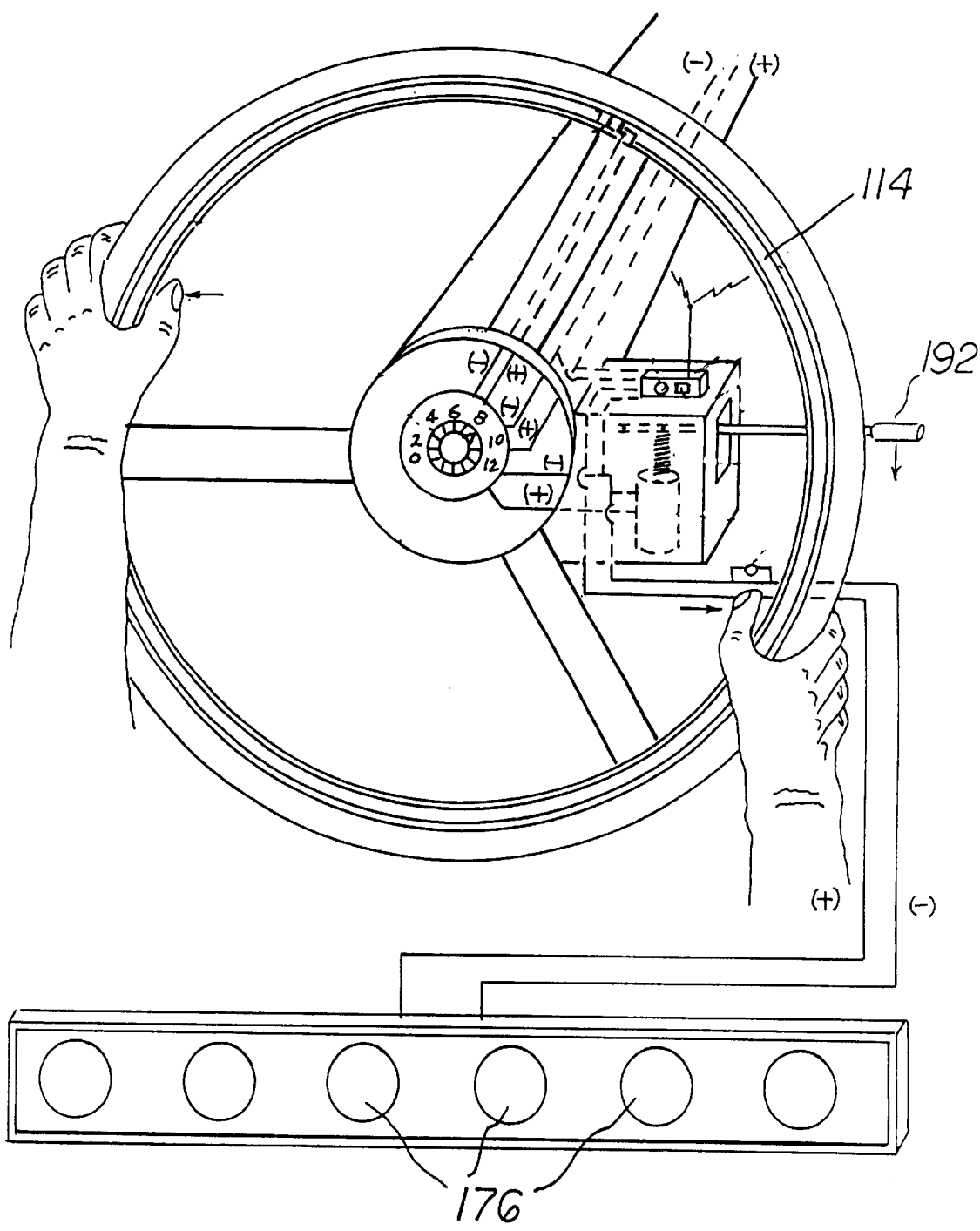
FIG. 28 is a front elevational view of the overall system designed for the pressure sensitive system.

The overall system designed for the pressure sensitive system is shown in FIG. 28.

Figure 29:
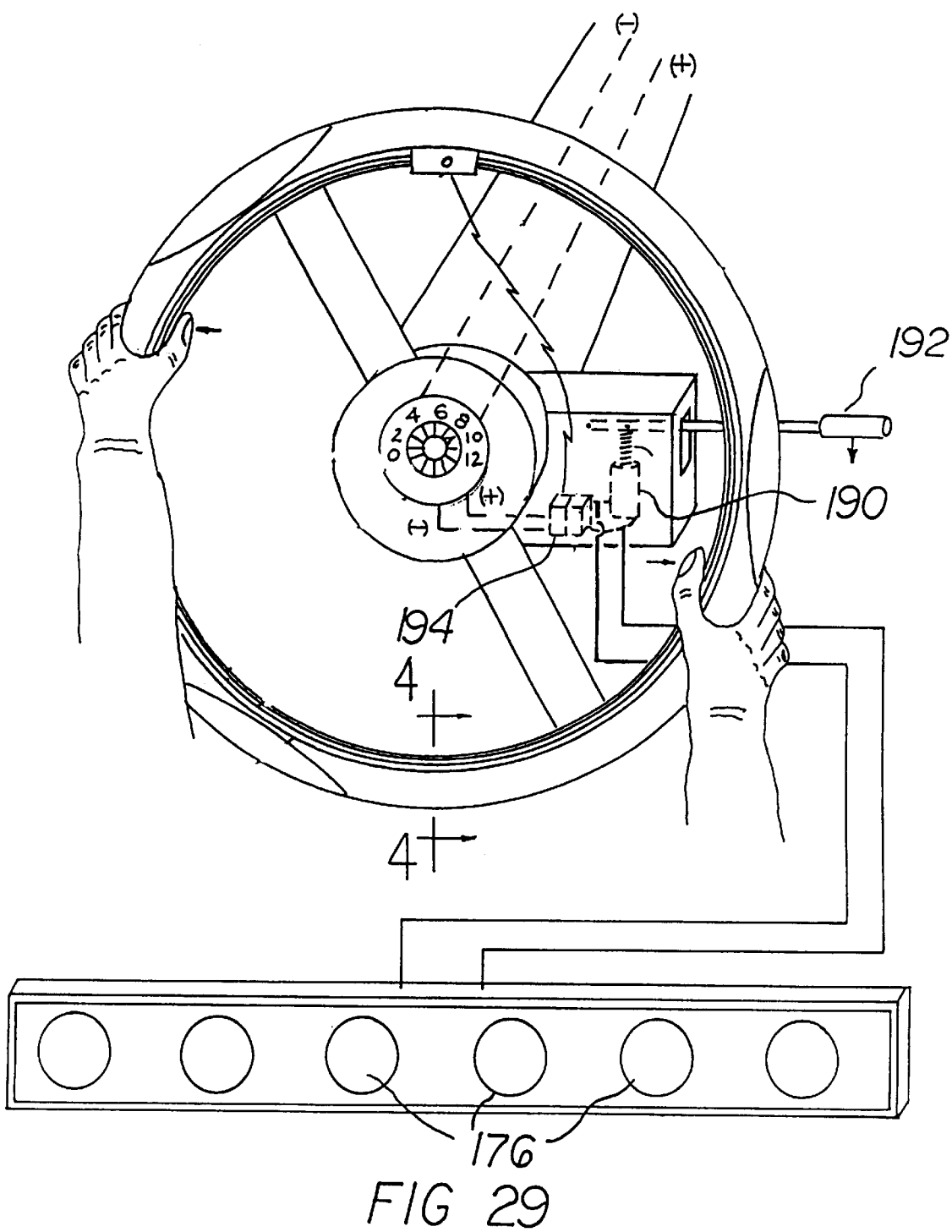
FIG. 29 is a front elevational view of an alternate embodiment of the invention utilizing radio waves from the pressure sensitive switch to the receiver, solenoid and manual override.

As shown in FIG. 29, still another embodiment, similar to FIGS. 22 and 28, utilizes radio waves from the transmitter 134 to the receiver 194, solenoid 190 and manual override 192. These lights 176 may be considered high intensity emergency braking lights.

Figure 30:
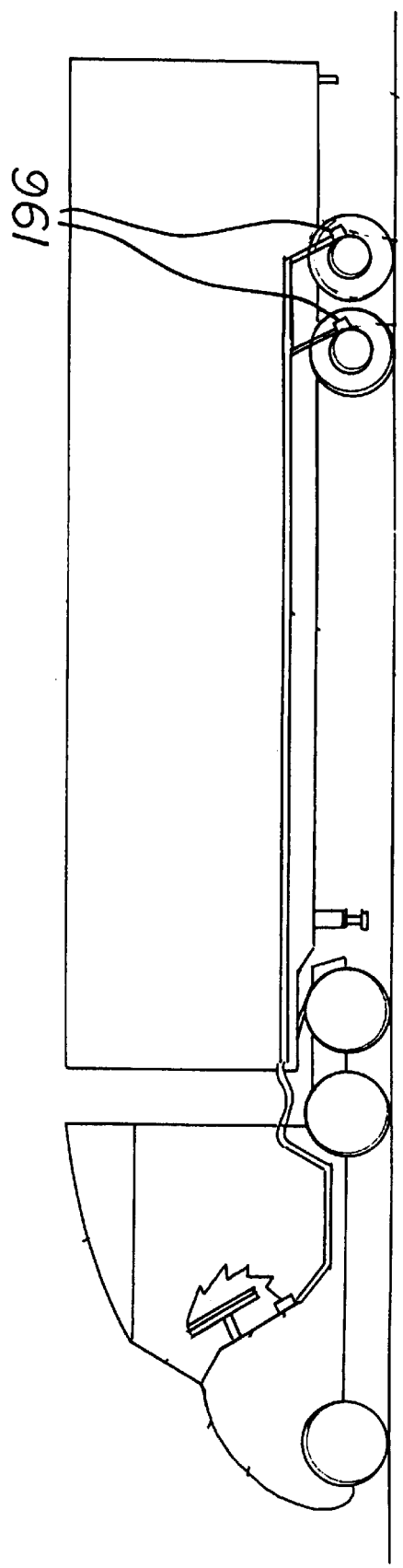
FIG. 30 is a side elevational view of an alternate embodiment of the invention in which the braking action is to the rear brakes of the trailer.

In the embodiment shown in FIG. 30, the braking is initiated by the driver acts upon the rear brakes of the trailer.

Figure 31:
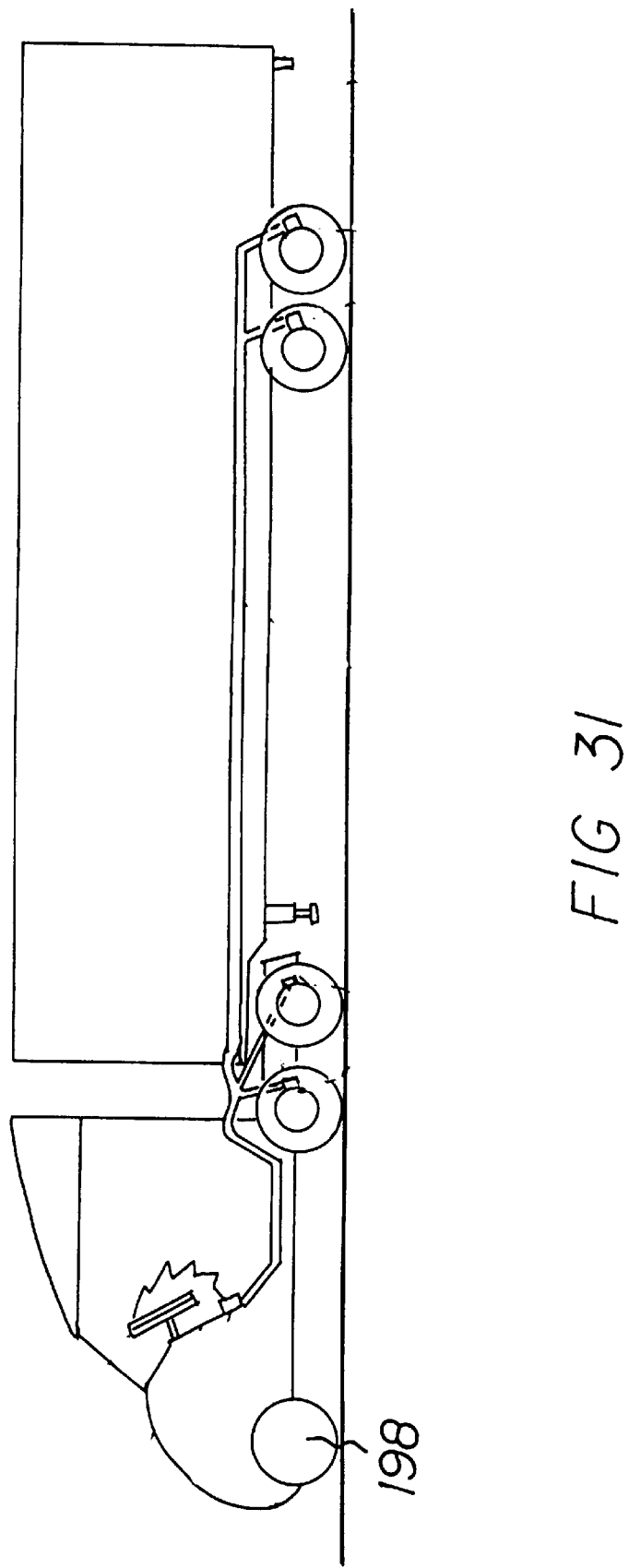
FIG. 31 is a side elevational view of an alternate embodiment of the invention in which the braking action is to the axles of the tractor and trailer except for the front steering axle.

A temporary braking of all of the axles of the tractor and trailer except for the front steering axle 198 is another embodiment of the invention. This embodiment, shown in FIG. 31, provides additional steering and control capabilities, in some emergencies, with minimum reduction in the braking.

As shown in FIG. 32, in an alternate embodiment of the system, positive and negative insulated wires are actuated by a switches 200. The system may alternatively use just one switch.

The present invention constitutes a technique to abate dangerous fish-tailing of a trailer under emergency situations. Such new technique, which simply involves the grasping of a steering wheel, is both natural and instinctive when a driver is faced with an emergency. Such new technique is also more rapid than prior techniques since there is no moving of one hand from the steering-wheel or searching for a trigger mechanism on the controller. Two handed steering is the safest steering. In addition, unlike prior techniques, the present invention is even more suitable for operation by a passenger in the event that the driver becomes incapacitated. The present invention is also suitable for operation by a one-armed driver.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A braking system for safe and convenient operation by a user comprising, in combination:
   a steering wheel in a torus shaped configuration;
   a tube positioned on the steering wheel in a torus shaped configuration, the tube adapted to be deformed upon the application of pressure by a user;
   electronic components within the tube operable to send signals in response to deforming of the tube by said user; and
   a trailer with wheels and brakes, the brakes being operable in response to signals from the electronic components.

2. The system as set forth in claim 1 wherein the tube includes internally a pair of spaced electrical wires which, when brought in contact with each other, will generate an electrical signal.

3. The system as set forth in claim 1 wherein the tube includes therein a pressure sensitive switch adapted to generate signals upon the deformation and contraction of the tube.

4. The system as set forth in claim 1 and further including a plurality of lights on the rear of the vehicle operable from the steering wheel and tube and wherein signals generated by the electronic components act to turn on the rear lights.

5. A braking system for safe and convenient operation by a user comprising, in combination:
   a steering wheel and cover in a torus shaped configuration;
   a tube positioned on the steering wheel cover in a torus shaped configuration, the tube adapted to be deformed upon the application of pressure by a user;
   a cable formed adjacent to the tube to preclude inadvertent twisting and bending of the tube for extending the life of the tube; and
   a trailer with wheels and brakes, the brakes being operable in response to signals from the electronic components.

6. The system as set forth in claim 1 and further including a transceiver capable of sending and receiving a danger signal to other vehicles.

7. The system as set forth in claim 1 wherein the tube contains insulated electrical wires and a switch, which when activated, will generate an electrical signal.

8. A dual braking system for use with a vehicle with a steering wheel and a trailer with brakes comprising a first circuit and a second circuit with a power source for powering both circuits, each circuit independently capable of energizing the brakes of the trailer, one of the circuits being operable from the steering wheel.

9. A system with a steering wheel and a trailer with brakes and for activating the brakes of the trailer from a primary brake controller, the primary brake controller being capable of removably receiving a modular retrofit assembly, the modular retrofit assembly having a receiver for receiving electronic signals provided by a user from the steering wheel.

10. A system with a steering wheel and a trailer with brakes and for activating the brakes of the trailer in response to a signal from the steering wheel, the system including a primary controller and a secondary controller, the primary controller having a plurality of settings and with the secondary controller having a plurality of corresponding settings adapted to be set by an operator upon a review of the primary settings.

* * * * *